(12) United States Patent
Miller

(10) Patent No.: US 11,883,887 B2
(45) Date of Patent: Jan. 30, 2024

(54) DRILL

(71) Applicant: MK-Tools-Service GmbH, Hauzenberg (DE)

(72) Inventor: Helmut Miller, Altenstadt (DE)

(73) Assignee: MK-Tools-Service GmbH, Hauzenberg (DE)

( * ) Notice: Subject to any disclaimer, the term of this patent is extended or adjusted under 35 U.S.C. 154(b) by 0 days.

(21) Appl. No.: 17/249,215

(22) Filed: Feb. 24, 2021

(65) Prior Publication Data

US 2021/0205900 A1     Jul. 8, 2021

Related U.S. Application Data

(63) Continuation of application No. PCT/EP2018/073756, filed on Sep. 4, 2018.

(51) Int. Cl.
    *B23B 51/02*      (2006.01)
    *B23B 51/06*      (2006.01)

(52) U.S. Cl.
CPC .............. *B23B 51/02* (2013.01); *B23B 51/06* (2013.01); *B23B 2250/12* (2013.01); *B23B 2251/043* (2013.01); *B23B 2251/14* (2013.01); *B23B 2251/204* (2013.01)

(58) Field of Classification Search
CPC ..... B23B 51/02; B23B 51/06; B23B 2250/12; B23B 2251/043; B23B 2251/14; B23B 2251/204; B23B 2251/04; B23B 2251/18; B23B 2251/408; B23B 2251/202; B23B 2251/082
See application file for complete search history.

(56) References Cited

U.S. PATENT DOCUMENTS

| | | | |
|---|---|---|---|
| 5,173,014 A | 12/1992 | Agapiou et al. | |
| 6,588,519 B2 | 7/2003 | Knoller | |
| 6,868,572 B1 * | 3/2005 | Newton | B25B 13/48 76/82 |
| 9,862,036 B2 * | 1/2018 | Krenzer | B23B 51/02 |
| 2008/0089753 A1 * | 4/2008 | Takikawa | B23B 51/02 408/230 |
| 2010/0143055 A1 * | 6/2010 | Kleiner | B23D 77/006 408/229 |

(Continued)

FOREIGN PATENT DOCUMENTS

| | | |
|---|---|---|
| CN | 105658361 | 6/2016 |
| DE | 4236823 | 2/1994 |

(Continued)

*Primary Examiner* — Alan Snyder
(74) *Attorney, Agent, or Firm* — Lipsitz & McAllister, LLC

(57) ABSTRACT

For improving a drill, in particular a spiral drill, comprising a base body extending substantially longitudinally in a direction axial to a drill axis, said base body comprising a drilling portion, wherein a radially inward core region in relation to the drill axis and a radially outer region are provided in the base body in the drilling portion, and the drilling portion comprises a plurality of spiral-shaped recesses in the outer region, and arranged between each two spiral-shaped recesses is a wall part, it is proposed that the drill comprises at least four main cutting edges, in particular exactly four main cutting edge and/or the drill comprises at least three central cutting edge portions.

33 Claims, 17 Drawing Sheets

(56) References Cited

U.S. PATENT DOCUMENTS

2013/0319774 A1 * 12/2013 Hammer ................. E21B 10/44
  175/394
2016/0214184 A1    7/2016 Krenzer et al.

FOREIGN PATENT DOCUMENTS

| DE | 69400475 | 2/1997 | | |
|----|----------|--------|---|---|
| DE | 10144241 | 4/2003 | | |
| DE | 202004010977 | 11/2005 | | |
| DE | 102014109344 | 3/2015 | | |
| EP | 0151251 | 8/1985 | | |
| GB | 2269124 | 2/1994 | | |
| WO | 9106387 | 5/1991 | | |
| WO | 2004082874 | 9/2004 | | |
| WO | 2005030418 | 4/2005 | | |
| WO | 2005118191 | 12/2005 | | |
| WO | WO-2013179417 A1 * | 12/2013 | ............. | B23B 51/02 |
| WO | 2015028431 | 3/2015 | | |
| WO | 2018065550 | 4/2018 | | |

* cited by examiner

DRILL

This application is a continuation of international application number PCT/EP2018/073756 filed on Sep. 4, 2018, which is incorporated herein by reference in its entirety and for all purposes.

BACKGROUND OF THE INVENTION

The invention relates to a drill, in particular a spiral drill. The drill is provided for drilling a drill hole in a workpiece. In particular, the drill is a metal drill, i.e. provided for drilling a drill hole in a metallic workpiece.

The drill comprises a base body, which extends substantially longitudinally in a direction axial to a drill axis. The base body comprises a drilling portion, which, in particular, extends in a direction axial to the drill axis up to a drill tip of the drill. A radially inward core region in relation to the drill axis and a radial outer region are provided in the base body in the drilling portion. The drilling portion has in the outer region a plurality of spiral-shaped recesses and a wall part is arranged between each two spiral-shaped recesses.

The problem with these drill is, on the one hand, achieving a large advance when drilling as well as achieving a good guidance of the drill, and simultaneously achieving a high precision of the drill hole to be drilled, for example with regard to the roundness, diameter tolerance, and/or the surface properties thereof. The problem underlying the present invention is thus to improve a generic drill, in particular with regard to these requirements.

SUMMARY OF THE INVENTION

In accordance with an embodiment of the invention, a drill of the kind stated at the outset is provided in which the drill, in particular the base body, comprises at least four main cutting edges and/or the drill, in particular the base body, comprises at least three central cutting edge portions.

In a particularly advantageous embodiment, provision is made for the drill, in particular the base body, to comprise exactly four main cutting edges.

In advantageous embodiments, the drill, in particular the base body, comprises exactly three central cutting edge portions.

In particularly preferably embodiments, the drill, in particular the base body, comprises at least four central cutting edge portions, in particular exactly four central cutting edge portions.

One of the advantages of the invention can thereby be seen in that by means of the at least four main cutting edges and/or the at least three central cutting edge portions, smaller chips are removed, in particular cut off, when drilling and thus the risk of a chip jam is reduced and the guidance of the drill is improved.

A further advantage of the solution in accordance with the invention is that by means of the cutting central cutting edge portions and/or the at least four main cutting edges, the advance when drilling can be increased compared to conventional drills.

It is thereby favorable, in particular, if the central cutting edge portions replace the otherwise typical chisel edge. The chisel edge, which is typically arranged in a center of a conventional drill, merely crushes the workpiece to be drilled. As a result of the friction of the chisel edge on the workpiece, a higher cutting pressure is required and an exact centering of the drill suffers due to this friction. As a result of the central cutting edge portions and/or the at least four main cutting edges, which, in particular, are of cutting configuration up to the center, the drill is of cutting configuration into its center and thus the advance can be increased with a lower cutting pressure and a higher centering accuracy can be achieved.

The main cutting edges are of substantially identical configuration. Insofar as a feature of a main cutting edge is mentioned without further specifying the main cutting edge, this is to be understood to mean that at least one main cutting edge comprises this feature, preferably all of the main cutting edges comprise this feature.

The drill extends in a direction axial to the drill axis up to a face side, which is arranged at the front on the drill in relation to an advance direction when drilling.

In particular, the main cutting edges extend along the face side, in particular only along the face side.

In particular, the drill, in relation to a location and/or a configuration of the main cutting edges, is configured rotationally symmetrically with respect to a rotation of 360°/N about the drill axis, N being the number of main cutting edges. The drill with four main cutting edges is thus configured rotationally symmetrically with respect to a rotation of 90° about the drill axis in relation to the location and/or the configuration of the main cutting edges.

In particular, provision is made in the main cutting edges for a respective rake face and a respective flank to extend toward the main cutting edge and to meet one another at the main cutting edge at a wedge angle. In particular, the wedge angle is at most 110°, preferably at most 90°, for example at most 80°. In particular, the wedge angle is at least 60°.

The flank extends at a clearance angle toward the main cutting edge, wherein the clearance angle is measured between the course of the flank and a geometric reference plane extending perpendicularly to the drill axis. The clearance angle is, for example, at least 1°, preferably at least 3°. In particular, the clearance angle is at most 25°, preferably at most 15°.

The rake face extends at a rake angle toward the main cutting edge, wherein the rake angle is measured between the course of the rake face and a geometric reference plane, which extends in parallel to the axial direction of the drill axis and, in particular, contains the drill axis. For example, the rake angle is between −10° and 25°, wherein negative values of the rake angle correspond to a relief-ground main cutting edge.

In one embodiment, provision is made for the wedge angle and/or the clearance angle and/or the rake angle to be substantially constant along the extent of the main cutting edge in the case of at least one main cutting edge.

In a preferred embodiment, provision is made, however, in the case of one, in particular some, preferably each of the main cutting edges, for the wedge angle and/or the rake angle and/or the clearance angle to vary along the extent of the respective main cutting edge, in particular to vary in one of the aforementioned angular ranges.

In particular, provision is made for the main cutting edges to each comprise different main cutting edge portions, wherein the individual main cutting edge portions are each formed by partial faces of the rake face and the flank.

It is favorable if at least one main cutting edge, in particular each of the main cutting edges, comprises a main cutting edge outer portion extending in the outer region. The main cutting edge outer portions of the respective main cutting edges are thereby preferably of substantially identical configuration.

Provision is preferably made for at least one main cutting edge outer portion, in particular each of the main cutting edge outer portions, to extend in the direction radial to the drill axis completely through the outer region.

For example, the main cutting edge outer portion extends substantially rectilinearly through the outer region.

It is preferable, however, for the main cutting edge outer portion to extend through the outer region in an, in particular slightly, curved manner.

It is favorable if at least one main cutting edge, preferably each main cutting edge, in particular the main cutting edge outer portion thereof, extends radially inwardly commencing from a radial outer side of the base body and, in particular, extends radially inwardly through the outer region.

In particular, provision is made for at least one main cutting edge, in particular each main cutting edge, to extend, at least in sections, along a radial extent of one of the wall parts.

The main cutting edge outer portion preferably extends completely along the radial extent of one of the wall parts.

In particular, a wall side of the wall part, which delimits a spiral-shaped recess, thereby forms an outer rake face as a partial face of the rake face for the main cutting edge outer portion.

In particular, the wall side on which the main cutting edge extends is arranged at the front on the corresponding wall part in relation to a direction of rotation when drilling about the drilling axis.

In preferred embodiments, provision is made for the main cutting edge to be undercut in the region of the main cutting edge outer portion, so that the rake angle has a negative value in this region.

It is particularly favorable if, in at least one main cutting edge, in particular in each of the main cutting edges, at least one partial region of a respective wall end face forms an outer flank as a partial face of the flank for the main cutting edge outer portion.

In preferred embodiments, provision is made for at least one main cutting edge, in particular each main cutting edge, to comprise a main cutting edge core portion, which extends in the core region.

In particular, the drill comprises a core part in the core region. In particular, the wall parts extend along an axial extent of the core part spirally around said core part.

It is particularly favorable if the core part has core recesses in a tip end region, which extends at the front on the drill in relation to the advance direction and, in particular, comprises the face side.

In particular, the core recesses are open toward the face side and radial outwardly.

In particular, the core recess opens radially outwardly at an opening angle. The opening angle is thereby measured, in particular, between two core wall sides of the core recess, which extend substantially radially outwardly.

In particular, the opening angle of at least one core recess, in particular of each core recess, in the case of a drill with at least four main cutting edges, in particular with exactly four main cutting edges, is at most 55°, preferably at most 45°, for example at most 40°.

For example, the opening angle of at least one core recess, in particular of each core recess, in the case of a drill with at least four main cutting edges, in particular with exactly four main cutting edges, is at least 30°.

A respective core recess preferably transitions radially outwardly into a respective spiral-shaped recess.

It is thereby favorable if at least one of the core recesses forms a point thinning with one of the spiral-shaped recesses.

It is particularly advantageous if each of the core recesses with the respective spiral-shaped recess thereof forms a point thinning for a respective main cutting edge.

In preferred embodiments, provision is made for at least one main cutting edge core portion, in particular each main cutting edge core portion, to extend along a respective core recess of the base body in the core region, i.e. in particular a core recess in the core part.

In particular, a respective core wall part extends substantially in the radial direction between two respective core recesses.

In particular, each core wall part substantially forms an extension in the direction radial to the drill axis of a respective wall part in the tip end region.

Provision is preferably made for at least one main cutting edge core portion, in particular each main cutting edge core portion, to extend along a respective core wall part.

Preferably at least one main cutting edge, in particular each main cutting edge, extends continuously through the outer region into the core region.

In particular, provision is made that, in at least one main cutting edge, in particular in each main cutting edge, the main cutting edge core portion thereof and the main cutting edge outer portion thereof merge into one another.

In one embodiment, provision is made for the main cutting edge to have a kink at the transition from the main cutting edge outer portion into the main cutting edge core portion.

In a preferred embodiment, provision is made, however, for the main cutting edge core portion and the main cutting edge outer portion to smoothly merge into one another, i.e. in particular the main cutting edge does not have a kink at this transition.

The central cutting edge portions are arranged in a central region of the drill.

In particular, the central region is a radially innermost region of the core region in relation to the drill axis.

For example, the core recesses extend in the direction radial to the drill axis up to the central region but not into the central region.

Provision is preferably made for the base body, in particular the core part thereof, to be of solid configuration in the central region, i.e. in particular to have no recesses in the central region.

The central cutting edge portions basically extend on the face side of the drill, in particular only on the face side of the drill.

In preferred embodiments, provision is made for at least one central cutting edge portion, in particular each central cutting edge portion, to extend radially inwardly in relation to the drill axis up to a front tip of the drill. For example, the at least one central cutting edge portion, in particular each of the central cutting edge portions, thereby extends substantially radially inwardly up to the drill axis.

The drill thereby thus has cutting portions in the central region as well, which, in particular, replace an otherwise typical chisel edge, thus reducing a friction between the drill and the workpiece to be drilled and an advance can be increased.

For example, the front tip is of substantially pyramidal configuration, wherein the central cutting edge portions, in particular, form the edges of the pyramid shape. The centering of the drill can thereby be improved.

In particular, provision is made that, in at least one central cutting edge portion, in particular in each central cutting edge portion, a central flank of the base body extends at a central clearance angle up to the central cutting edge portion.

The central clearance angle is measured between the course of the central flank and a geometric reference plane extending perpendicularly to the drill axis.

Preferably, the central clearance angle is at least 3°.

For example, the central clearance angle is at most 25°, preferably at most 15°.

In particular, provision is made that, in at least one central cutting edge portion, preferably in each of the central cutting edge portions, a central rake face of the base body extends at a central rake angle up to the central cutting edge portion. The central rake angle is measured between the course of the central rake face and a geometric radial reference face. The geometric radial reference face extends in parallel to the drill axis and, in particular, the geometric radial reference face contains the drill axis.

In particular, the central rake angle is at least −5°. The formulation that the angle is at least −5° is hereby to be understood to mean that the angle either has a negative value and its absolute value is less than or equal to 5°, or that the central rake angle is 0°, or that the central rake angle has a positive value.

Negative values of the central rake angle thereby correspond to an undercut of the central cutting edge portion in relation to the geometric radial reference face.

In particularly preferable embodiments, provision is made for the central rake angle to be at least −1°, in particular greater than 0°.

For example, the central rake angle is at most 20°, in particular at most 15°.

Provision is preferably made for the central cutting edge portions to extend sharply toward one another radially inwardly toward the drill axis.

In particular, provision is made for at least one central cutting edge portion, in particular each of the central cutting edge portions, to extend toward the drill axis at an angle of inclination. The angle of inclination is thereby measured between the course of the central cutting edge portion and the radial direction of the drill axis.

For example, the angle of inclination is at least 5°, preferably at least 15°, particularly preferably at least 20°.

In particular, the rise angle is at most 40°, for example at most 35°, for preferably at most 30°.

In particularly preferable embodiments, provision is made for at least one main cutting edge, in particular each of the main cutting edges, to comprise a main cutting edge central portion. The main cutting edge central portion extends in the central region of the drill.

The one main cutting edge or each of the main cutting edges is of cutting configuration into the central region, thus improving the removal of chips and reducing a friction of the drill. This enables a greater advance of the drill when drilling, with greater precision at the same time.

In particular, provision is made that, at least in one main cutting edge, in particular in each main cutting edge, the main cutting edge central portion thereof is connected to the main cutting edge core portion thereof and/or to the main cutting edge outer portion thereof. This has the advantage that the main cutting edge extends continuously radially inwardly into the central region and thus the chips can be effectively removed when drilling.

In particularly preferable embodiments, at least one of the main cutting edges, in particular each of the main cutting edges, extends continuously from the outer side of the drill, in particular the base body, radially inwardly into the central region and, for example, substantially up to the drill axis.

In particular, provision is made that, in one main cutting edge, preferably in each of the main cutting edges, the cutting edge central portion thereof transitions into the main cutting edge core portion thereof. The main cutting edge is thus of cutting configuration throughout, even in a radially outer rim region of the central region.

In some preferred embodiments, the main cutting edge central portion transitions smoothly, i.e. without a kink, into the main cutting edge core portion.

In other preferred embodiments, the main cutting edge has a kink at the transition from its main cutting edge central portion into its main cutting edge core portion.

It is particularly favorable if at least one main cutting edge central portion, in particular each of the main cutting edge central portions, is formed by a central cutting edge portion with one or more of the aforementioned features.

In some preferred embodiments, each of the central cutting edge portions forms a respective main cutting edge central portion. In these embodiments, the drill thus comprises the same number of central cutting edge portions as main cutting edges. In particularly preferable embodiments, the drill comprises four main cutting edges and four central cutting edge portions, wherein the four central cutting edge portions form the four main cutting edge central portions.

In other preferred embodiments, the drill comprises more central cutting edge portions than main cutting edges.

For example, a respective central cutting edge portion, which is not associated with a main cutting edge, is arranged between two respective central cutting edge portions, which also form a main cutting edge central portion of one of the main cutting edges.

In a particularly preferable embodiment, the drill comprises two main cutting edges and four central cutting edge portions, wherein two of the central cutting edge portions each form a main cutting edge central portion. Provision is thereby preferably made for a respective central cutting edge portion, which does not form a main cutting edge central portion, to be arranged between the two central cutting edge portions forming a main cutting edge central portion, in relation to the circumferential direction about the drill axis.

In preferred embodiments, provision is made for at least one wall part, in particular each wall part, to comprise a secondary cutting edge. In particular, the precision when drilling is improved as a result.

In particular, provision is made for the at least one secondary cutting edge or each of the secondary cutting edges to extend on the outer side of the respective wall part.

In particular, the one or more secondary cutting edge(s) extend substantially along the spiral-shaped shape of the respective wall part.

For example, provision is made for a radius of the base body in the drilling portion to extend at least 15%, preferably at least 25%, particularly preferably at least 30%, for example at least 35%, through the core region. A drill that is more stable than usual due to the thicker core is thus provided.

For example, the radius of the base body in the drilling portion extends at most 45%, in particular at most 40%, through the core region.

In particular, a radius of the core region extends at least 15%, preferably at least 25%, for example at least 30% through the central region of the core region.

In particular, provision is made for the radius of the core region to extend at most 50%, in particular at most 40%, through the central region of the core region.

In particular, at least one of the spiral-shaped recesses, in particular each of the spiral-shaped recesses, in the case of a drill with at least four main cutting edges, in particular with exactly four main cutting edges, extends in a cross sectional area, extending perpendicularly to the drill axis, through an angular range, which is delimited by the wall sides delimiting the spiral-shaped recess and which has an opening angle of at least 40° and/or an opening angle of at most 60°.

In particular, provision is made for at least one of the wall parts, in particular each wall part, in the case of a drill with at least four main cutting edges, in particular with exactly four main cutting edges, to extend in a cross sectional area, extending perpendicularly to the drill axis, through an angular range, wherein the angular range has an opening angle of at least 30° and/or an opening angle of at most 50°.

In particularly preferred embodiments, the base body is coated at least in the drilling portion and/or e.g. in the fastening portion, namely in particular with a coat that hardens the base body. The base body thus becomes more stable and a longer service life of the drill is possible.

In particular, provision is made for the base body to taper in the region of the drilling portion counter to the advance direction.

In particular, provision is made for the base body to comprise a fastening portion.

In particular, the fastening portion extends in a direction axial to the drill axis, namely in particular commencing from a rear side opposite the face side. For example, the fastening portion extents substantially up to the drilling portion.

The fastening portion is, in particular, provided for insertion into a drilling machine. The drill can thus be fastened at the fastening portion to the drilling machine and the drilling machine can transmit a rotational movement about the drill axis to the drill for drilling.

In particularly preferred embodiments, provision is made for the base body to have a larger radius in the region of the fastening portion than in the drilling portion. Thus, in particular, the drill can be more tightly fastened at the fastening portion to the drilling machine as a result of the larger area, and a higher torque can be transmitted to the drill and the advance when drilling can be increased.

It is particularly preferable if the drill comprises a cooling device with a cooling channel or with a plurality of cooling channels.

A cooling liquid can thereby be transported through the one or more cooling channels to the drill hole. The drill is cooled by the cooling liquid, thus making it possible to increase the advance.

In a preferred embodiment, provision is made for at least one cooling channel to extend, at least in sections, through one of the wall parts. For example, a cooling channel extends, at least in sections, through at least two of the wall parts, in particular through each of the wall parts.

In particular, provision is made for the cooling channel extending at least in sections through a wall part to exit the wall part on the face side of the drill with an opening. The cooling liquid is thus transported directly to the drill tip and directly cools the main cutting edges.

For example, the cooling liquid exiting at the drill tip is thereby pressed back through the spiral-shaped recesses counter to the advance direction, such that an improved removal of the chips takes place.

In a particularly preferred embodiment, provision is made for at least one cooling channel, in particular each of the cooling channels exiting through a wall part, to extend at least approximately along the entire spiral-shaped extent of a wall part. It is thus achieved that even when the drill is reground, the opening of the cooling channel is arranged on the respective wall end face of the wall part.

In a different advantageous embodiment, provision is made for the cool channel extending through the wall part to extend radially inwardly to a central channel. This enables a constructively simple solution.

In a further preferred embodiment, provision is made for at least one cooling channel, for example as a groove, to extend on an outer side of the fastening portion. This makes it possible to provide the drill with at least one cooling channel in a constructively simple manner.

In particular, preferred embodiments are as follows.

1. Drill (10), in particular spiral drill, comprising a base body (12) extending substantially longitudinally in a direction axial to a drill axis (14), said base body (12) comprising a drilling portion (24), wherein a radially inward core region (122) in relation to the drill axis (14) and a radially outer region (124) are provided in the base body (12) in the drilling portion (24), and the drilling portion (24) comprises a plurality of spiral-shaped recesses (116) in the outer region (124), and arranged between each two spiral-shaped recesses (116) is a wall part (114), wherein the drill (10) comprises at least four main cutting edges (300), in particular exactly four main cutting edges (300), and/or the drill (10) comprises at least three central cutting edge portions (210).

2. Drill (10) in accordance with embodiment 1, wherein the drill (10), in relation to a location and/or a configuration of the main cutting edges (300), is of rotationally symmetrical configuration with respect to a rotation of 360°/N about the drill axis (14), N being the number of main cutting edges.

3. Drill (10) in accordance with any one of the preceding embodiments, wherein at least one main cutting edge (300), in particular each of the main cutting edges (300), comprises a main cutting edge outer portion (302) extending in the outer region (124), wherein, in particular, at least one main cutting edge outer portion (302), in particular each of the main cutting edge outer portions (302), extends in a direction radial to the drill axis (14) completely through the outer region (124).

4. Drill (10) in accordance with any one of the preceding embodiments, wherein at least one main cutting edge (300), in particular each of the main cutting edges (300), extends, at least in sections, in particular completely with its main cutting edge outer portion (302), along a radial extent of one of the wall parts (114).

5. Drill (10) in accordance with any one of the preceding embodiments, wherein at least one main cutting edge (300), in particular each of the main cutting edges (300), comprises a main cutting edge core portion (304), which extends in the core region (122).

6. Drill (10) in accordance with any one of the preceding embodiments, wherein at least one main cutting edge core portion (304), in particular each main cutting edge core portion (304), extends along a respective core recess (156) of the base body (12) in the core region (122).

7. Drill (10) in accordance with any one of the preceding embodiments, wherein at least one of the core recesses (156) forms a point thinning with one of the spiral-shaped recesses (116), in particular each of the core recesses (156) forms a respective point thinning with a respective spiral-shaped recess (116).

8. Drill (10) in accordance with any one of the preceding embodiments, wherein at least one main cutting edge core portion (304) extends along a core wall part (152), in particular each main cutting edge core portion (304) extends along a respective core wall part (152).

9. Drill (10) in accordance with any one of the preceding embodiments, wherein in at least one of the main cutting edges (300), in particular in each main cutting edge (300), the main cutting edge core portion (304) and main cutting edge outer portion (302) thereof merge into one another.

10. Drill (10) in accordance with any one of the preceding embodiments, wherein at least one central cutting edge portion (210), in particular each central cutting edge portion (210), extends radially inwardly, in relation to the drill axis (14), up to a front tip (176).

11. Drill (10) in accordance with any one of the preceding embodiments, wherein in at least one of the central cutting edge portions (210), in particular in each central cutting edge portion (210), a central flank (214) of the base body (12) extends at a central clearance angle (ZF) up to the central cutting edge portion (210), wherein the central clearance angle (ZF) is measured between the central flank (214) and a geometric reference plane extending perpendicularly to the drill axis, and wherein the central clearance angle (ZF) is at least 3° and/or at most 25°.

12. Drill (10) in accordance with any one of the preceding embodiments, wherein in at least one of the central cutting edge portions (210), in particular in each central cutting edge portion (210), a central rake face (212) of the base body (12) extends at a central rake angle (ZS) up to the central cutting edge portion (210), wherein the central rake angle (ZS) is measured between the central rake face (212) and a geometric radial reference face, which extends in parallel to the drill axis (14), and wherein the central rake angle (ZS) is at least −5° and/or is at most 20°, wherein negative values of the central rake angle (ZS) correspond to an undercut of the central cutting edge portion (210).

13. Drill (10), in accordance with any one of the preceding embodiments, wherein at least one central cutting edge portion (210), in particular each central cutting edge portion (210), extends at an angle of inclination (A) to the drill axis (14), which angle is at least 5° and/or at most 40°, wherein the angle of inclination (A) is measured between the course of the central cutting edge portion (210) and the radial direction of the drill axis (14).

14. Drill (10) in accordance with any one of the preceding embodiments, wherein at least one of the main cutting edges (300), in particular each of the main cutting edges (300), comprises a main cutting edge central portion (306), which extends in a central region (166) that is central in relation to the drill axis in the radial direction.

15. Drill (10) in accordance with any one of the preceding embodiments, wherein at least in one of the main cutting edges (300), in particular in each of the main cutting edges (300), the main cutting edge central portion (306) thereof merges into the main cutting edge core portion (304) thereof.

16. Drill (10) in accordance with any one of the preceding embodiments, wherein at least one of the main cutting edge central portions (306) is formed by one of the central cutting edge portions (210), in particular in that each of the main cutting edge central portions (306) is formed by a respective central cutting edge portion (210).

17. Drill (10) in accordance with any one of the preceding embodiments, wherein at least one of the wall parts (114), in particular each of the wall parts (114), comprises a secondary cutting edge (144).

18. Drill (10) in accordance with any one of the preceding embodiments, wherein the secondary cutting edge (144) extends substantially along a spiral-shaped shape of the wall part (114) on the outer side (132) thereof.

19. Drill (10) in accordance with any one of the preceding embodiments, wherein a radius (86) of the base body in the drilling portion (24) extends at least 15% and/or at most 45% through the core region (122).

20. Drill (10) in accordance with any one of the preceding embodiments, wherein a radius (126) of the core region (122) extends at least 15% and/or at most 50% through the central region (166) of the core region (122).

21. Drill (10) in accordance with any one of the preceding embodiments, wherein the base body (12) has a larger radius (56) in the region of a fastening portion (22) than in the drilling portion (24).

22. Drill (10) in accordance with any one of the preceding embodiments, wherein the drill (10) comprises a cooling device (432) with a cooling channel (412) or with a plurality of cooling channels (412).

23. Drill (10) in accordance with any one of the preceding embodiments, wherein at least one cooling channel (412) extends at least in sections through one of the wall parts (114).

24. Drill (10) in accordance with any one of the preceding embodiments, wherein at least one cooling channel (412) extends at least approximately along the entire spiral-shaped extent of one of the wall parts (114).

25. Drill (10) in accordance with any one of the preceding embodiments, wherein at least one cooling channel (412) extends on an outer side (54) of the fastening portion (22).

Further advantages and preferred features of the drill are subject matter of the subsequent description and the graphical depiction of a few exemplary embodiments.

BRIEF DESCRIPTION OF THE DRAWINGS

FIG. 9: shows the cut in accordance with FIG. 8 with the angles drawn in;

DETAILED DESCRIPTION OF THE INVENTION

Figure 1:
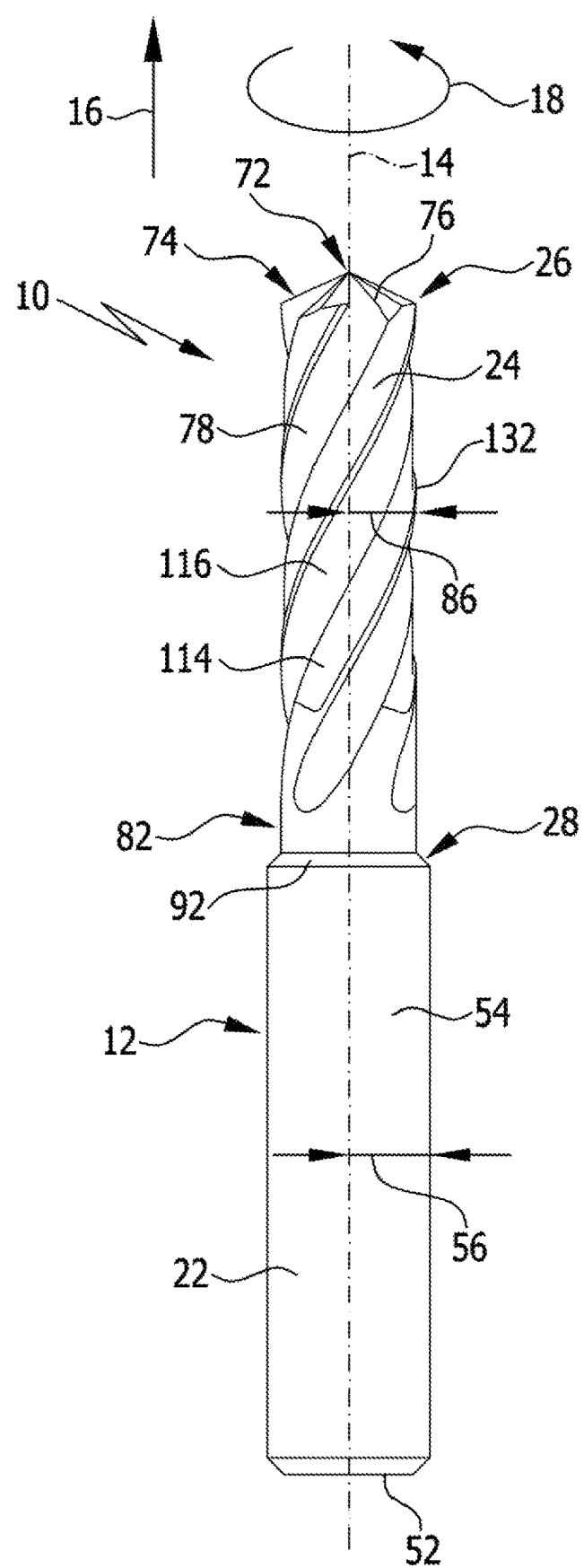
FIG. 1: shows a side view of a drill with four main cutting edges in accordance with a first embodiment.

In a first embodiment of a drill, designated as a whole by the reference numeral 10, which is exemplarily depicted in FIGS. 1 to 11, said drill comprises a base body 12, which extends substantially longitudinally in a direction axial to a drill axis 14.

In the following, indication of orientation, alignment, position and the like that relate to an axis, like e.g. "axial", "radial", are to be understood in relation to the drill axis 14, unless otherwise specified.

In particular, the base body 12 extends in the axial direction substantially cylindrically at least in sections.

The drill axis 14 extends in the axial direction substantially in the direction of an advance direction 16, wherein the drill 10, when drilling, is moved in the direction of the oriented advance direction 16 into a workpiece to be drilled.

The drill axis 14 corresponds substantially to a rotational axis about which the drill 10 rotates in a direction of rotation 30 when drilling.

In particular, the base body 12 comprises different portions and parts, as described in the following, but is formed in one piece.

The base body 12 comprises a fastening portion 22 and a drilling portion 24. In particular, the fastening portion 22 is thereby provided for the fastening of the drill 10 to a drilling machine and the drilling portion 24 comprises, in particular, a cutting part 26 of the drill 10 and is provided for drilling into a workpiece to be drilled, in particular a metallic workpiece.

The fastening portion 22 and the drilling portion 24 are axial portions of the base body 12, extending longitudinally along the drill axis 14. In particular, a transition region of the base body 12 is provided, in which the drilling portion 24 transitions into the fastening portion 22.

In particular, the fastening portion 22 extends from a rear side 52 of the base body 12 in the axial direction into the transition region 28.

The fastening portion 22 has an outer side 54 which, in this embodiment, extends substantially coaxially to the drill axis 14.

The outer side 54 extends substantially spaced from the drill axis 14 by a radius 56 and extends around said drill axis 14 and, in this embodiment, the radius 56 is approximately constant along the axial extent of the fastening portion 22.

In particular, in this embodiment, the fastening portion 22 is configured substantially as a cylindrical shank.

In variants of the embodiment, the fastening portion 22 is configured substantially as a taper shank.

The drilling portion 24 extends longitudinally axially to the drill axis 14 and in the direction of the advance direction 16 up to a face side 72 of the base body 12.

In particular, the drilling portion 24 extends from the face side 72 up to the transition region 28.

The face side 72 is an end side of the base body 12 in the axial direction.

When drilling in the designated manner, the face side 72 is, in relation to the advance direction 16, a front side of the base body 12 and is the first part of the base body 12 to penetrate into the workpiece to be drilled.

One the face side 72, the drilling portion 24 forms in a tip end region 74 a drill tip 76 which is adjoined along the further axial extent of the drilling portion 24 by a drilling main portion 78.

The drilling main portion 78 extends axially between the tip end region 74 and a connecting end region 82 of the drilling portion 84, at which the drilling portion 24 transitions into the next axial portion of the base body 12, in particular into the fastening portion 22 in the transition region 28.

The drilling portion 24 has a radius 86 which is measured, in particular, in the drilling main portion 78.

The radius 56 of the fastening portion 22 is preferably larger than the radius 86 of the drilling portion 24. A radius of the base body 12 thus becomes larger, for example, in the transition region 28.

For example, a step 92 is provided in the transition region 28.

Figure 2:
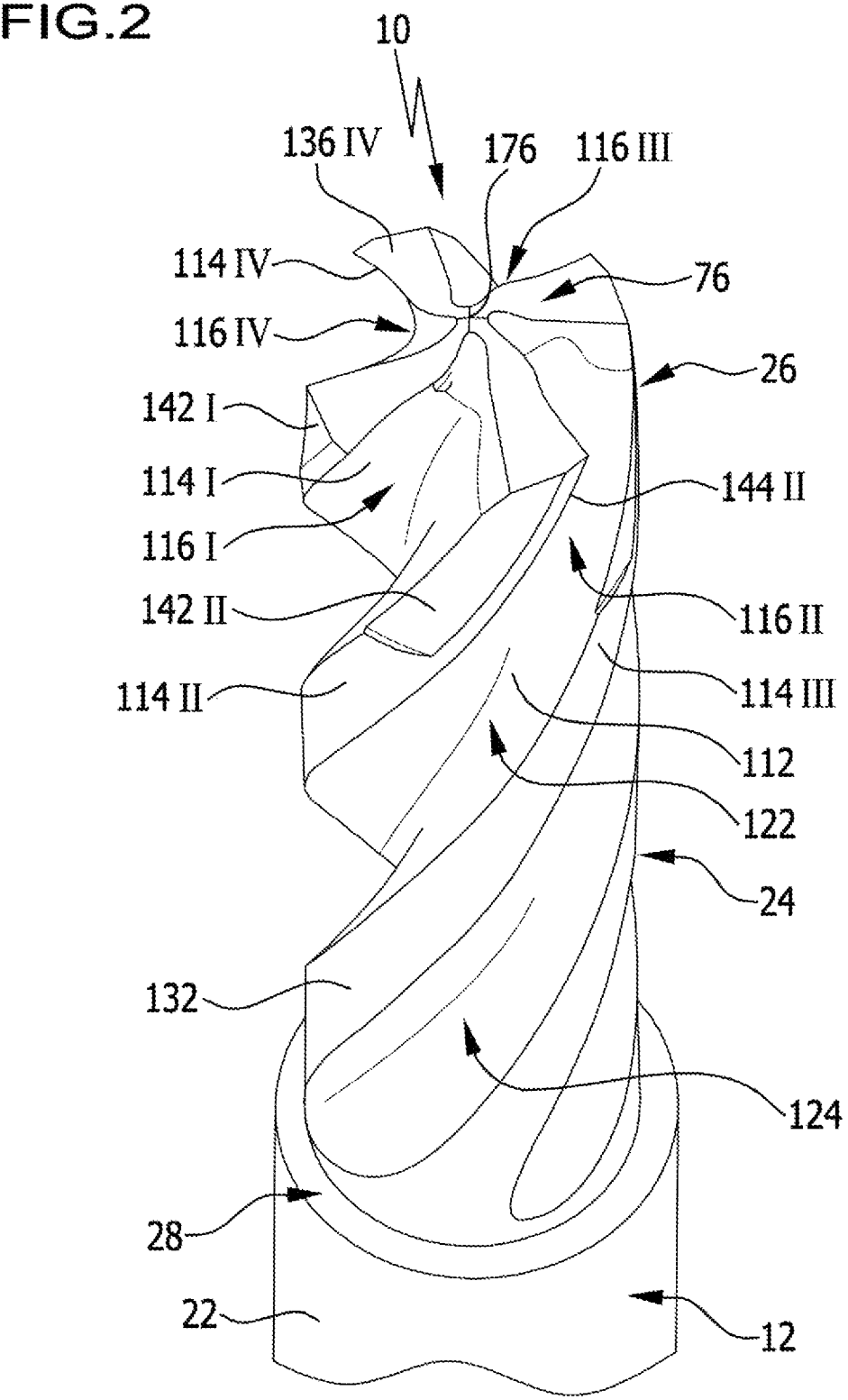
FIG. 2: shows a perspective depiction of the drill in accordance with the first embodiment.
Figure 3:
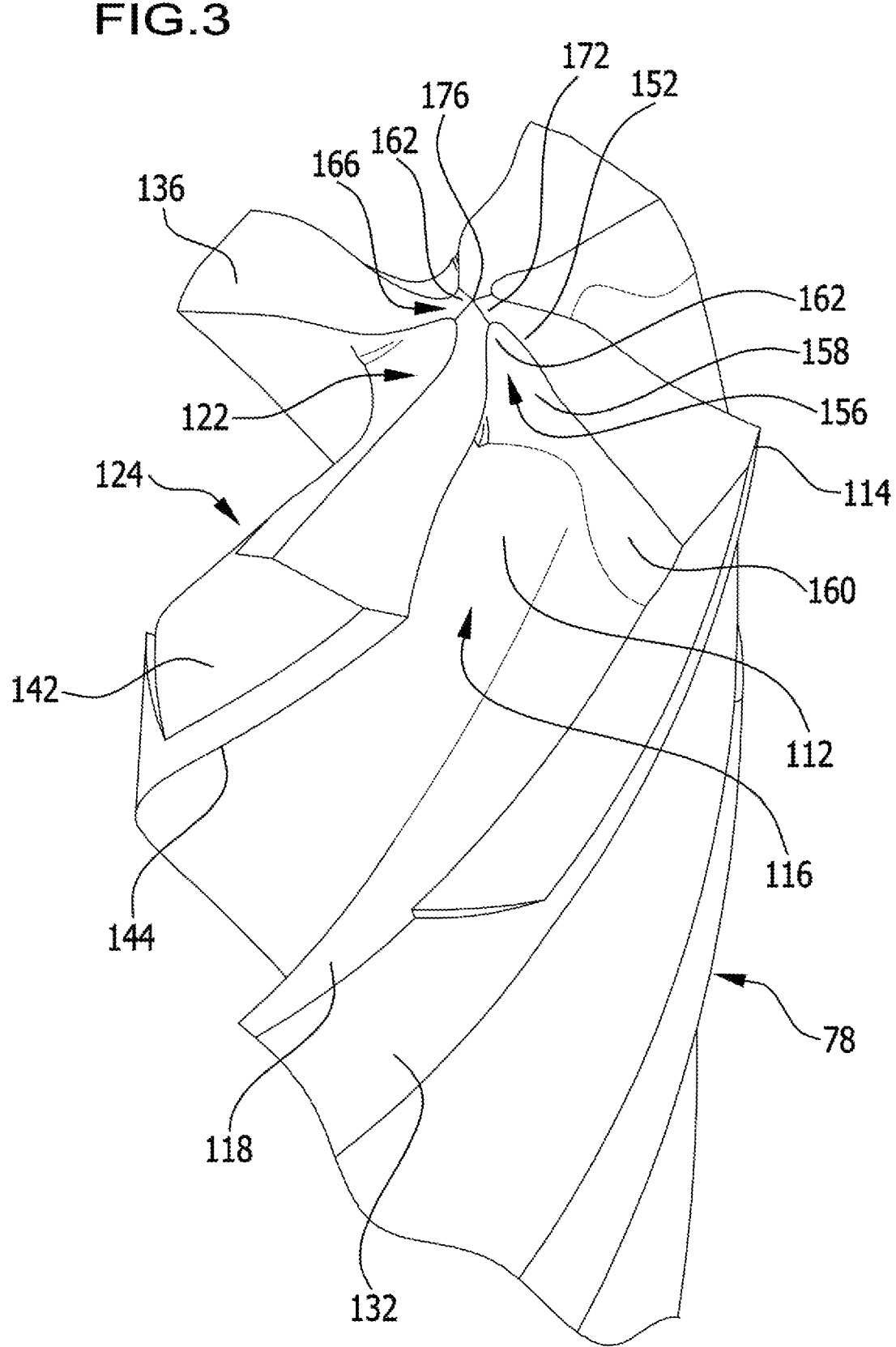
FIG. 3: shows a perspective depiction of a view of a face side of the drill of the first embodiment.

In the drilling portion 24, the drill 10 comprises a core part 112 and four wall parts 114I, 114II, 114III, 114IV, collectively referred to as the wall parts 114, and four spiral-shaped recesses 116I, 116II, 116III, 116IV, collectively referred to as the spiral-shaped recesses 116 (FIGS. 2, 3).

In the following, elements of substantially identical configuration and fulfilling the basically same function are described collectively and are denoted with a common reference numeral, for example the wall parts 114 and the spiral-shaped recesses 116. If exactly one such element of substantially identical configuration and fulfilling the basically same function is referred to or if exactly one such element is described, a Roman numeral denoting this exact element will be added to the common reference numeral.

The core part 112 and the wall parts 114 are parts of the base body 12 formed in one piece and the spiral-shaped recesses 116 are recesses in this base body 12.

The core part 112 extends coaxially to the drill axis 14 substantially along the entire axial extent of the drill portion 24, namely in a core region 122 thereof.

The three-dimensional core region 122 extends coaxially to the drill axis 14. In particular, the core region 122 is configured rotationally-symmetrically to the drill axis 14 and, for example, cylindrically with a circular base surface. In the core region 122, the base body 12 is of substantially solid configuration and forms the core part 112.

An outer region 124 extends in a circumferential direction around the drill axis 14 radially outside of the core region 122 around same in a closed manner, and the outer region 124 extends in the axial direction substantially coaxially to the drill axis 14 and the core region 122.

In particular, the core region 112 contacts the outer region 124 with a radial outer side at a radial inner side of the outer region 124. For example, the core region 122 and the outer region 124 touch at a radial distance from the drill axis 14 corresponding to a core radius 126.

The wall parts 114 are arranged in the outer region 124.

The wall parts 114 are connected to the core part 112 and the wall parts 114 merge into the core part 112 in a transition from the outer region 124 to the core region 122.

The radius 86 of the drilling portion 24 corresponds, in particular, to a radial distance of an outer side 132 of a wall part 114 from the drill axis 14.

The wall parts 114 extend spirally along the axial extent of the core part 112 in the drilling main portion 78 in the outer region 124 around the core part 112 at least partially into the tip end region 74.

For example, a spiral angle of the of the wall parts is in the range between 10° and 60°, wherein the spiral angle indicates the pitch of a spiral shape of the spiral-shaped recesses 116.

The wall parts 114 end on the face side 72 and form wall end faces 136 at their ends there.

The wall end faces 136 extend in the tip end region 74. In particular, the wall end faces 136 extend commencing from the outer side 132 with increasing radial inward extent slightly rising in the direction of the advance direction 16.

Along their spiral-shaped course, the wall parts 114 each form two wall sides 138.

The wall sides 138 extend, on the one hand, commencing from the outer side 132 radially inwardly and extend, on the other hand, along the spiral-shaped extent of the respective wall part 138.

Between each two spiral-shaped recesses 116, a respective wall part 114 is arranged, for example the wall part 114I is arranged between the spiral-shaped recesses 116IV and 116I.

The spiral-shaped recesses 116 extend in the outer region 124 and correspond to the spiral-shaped course of the wall parts 114. In particular, the spiral-shaped recesses 116 extend radially up to the core region 122, but not into the core region 122.

In particular, at least a small region of the core part 112 thus delimits the spiral-shaped recesses 116 in the radial direction. Otherwise, the spiral-shaped recesses 116 are delimited by the wall parts 114 with the wall sides 138 thereof, wherein in each case two wall parts 114 delimit a respective spiral-shaped recess 116 substantially in the circumferential direction around the drill axis 14. Thus, for example, the spiral-shaped recess 116II is delimited by the wall parts 114II and 114III.

The spiral-shaped recesses 116 are open radially outwardly.

In particular, substantially in each case a respective wall part 114 and a spiral-shaped recess 116 extend through a cross sectional area, extending perpendicularly to the drill axis 14, in a respective quadrant commencing from the drill axis 14.

For example, the wall part 115 extends through the cross sectional area extending perpendicularly to the drill axis 14 through an angular range 139 commencing from the drill axis, which angular range 139 is between 40° and 60°.

In particular, the spiral-shaped recess 116 extends through the cross sectional area, extending perpendicularly to the drill axis 14, through an angular range 141 commencing from the drill axis 14, which angular range 141 is e.g. between 30° and 50°.

The angular ranges 139 and 141 are in relation, in particular, to the extent of the wall part 114 or the spiral-shaped recess 116 along the outer side of the base body 12 in the circumferential direction around the drill axis 14.

The spiral-shaped recesses 116 form flutes, through which chips produced when drilling can leave the drill tip 76 or can be removed from the drill tip 76.

Provision is preferably made for the wall parts 114 to comprise on their respective outer side 132 a respective land 142, wherein the respective land 142 is preferably arranged in an end portion of the outer side 132 commencing form the tip end region 74.

In variants of the embodiment, provision is made for the wall parts 114 to each comprise a secondary cutting edge 144.

In particular, the secondary cutting edge 144 extends substantially spirally at least along a portion of the spiral-shaped extent of the wall part 114.

In particular, the secondary cutting edge 144 extends on the outer side 132, namely at an end of the outer side 132 extending along a spiral-shaped recess 116, said end being located at the front in relation to the direction of rotation.

In particular, provision is made for the drilling portion 24 to taper in the direction opposite the advance direction 16, i.e. in particular from the tip end region 74 toward the connecting end region 82. For example, a tapering in the range of 0.1 mm to 1 mm up to 100 mm of axial extent, in particular a tapering from at least approximately 0.5 mm to 100 mm of axial extent.

Figure 4:
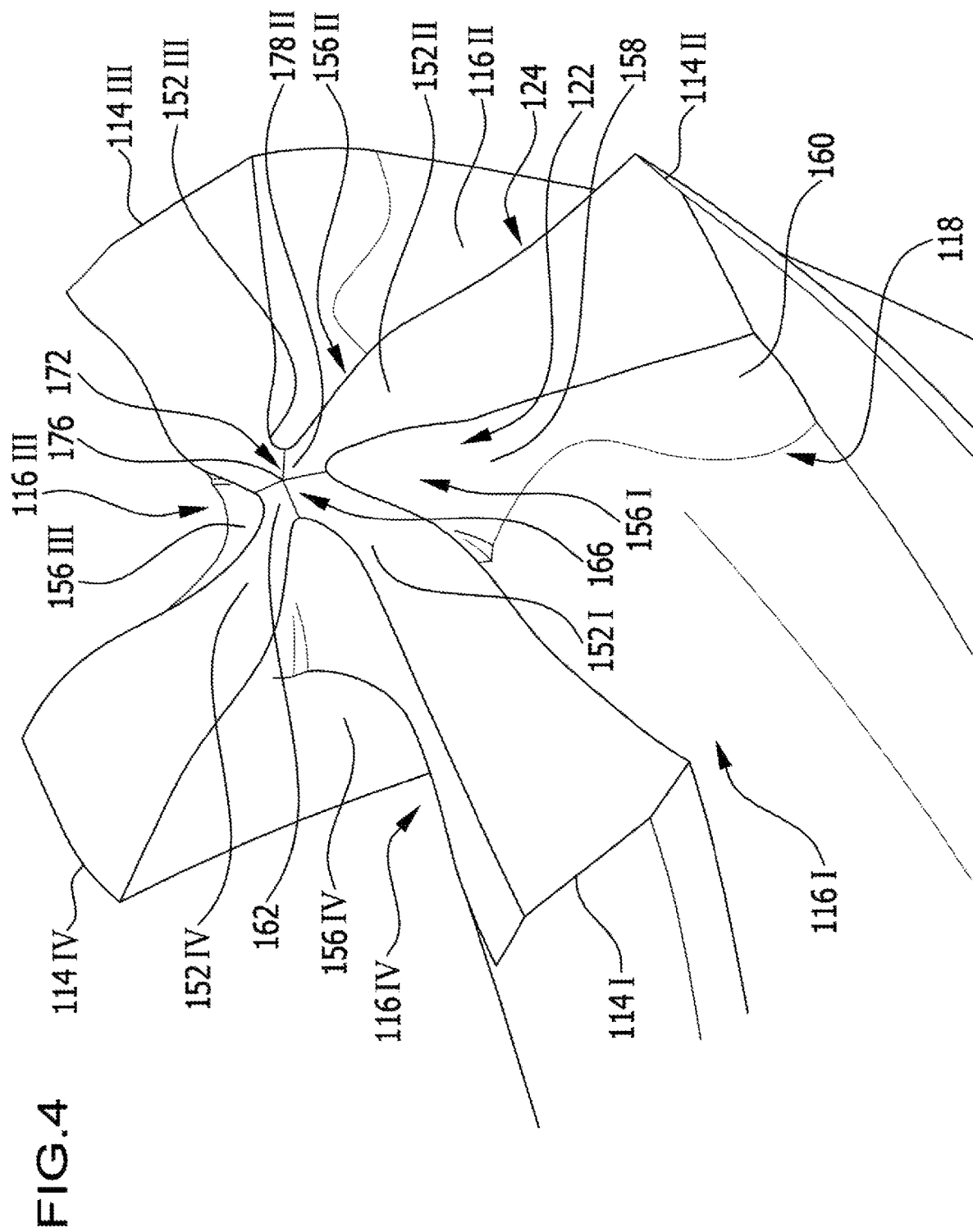
FIG. 4: shows a perspective depiction a drill tip of the drill of the first embodiment.
Figure 5:
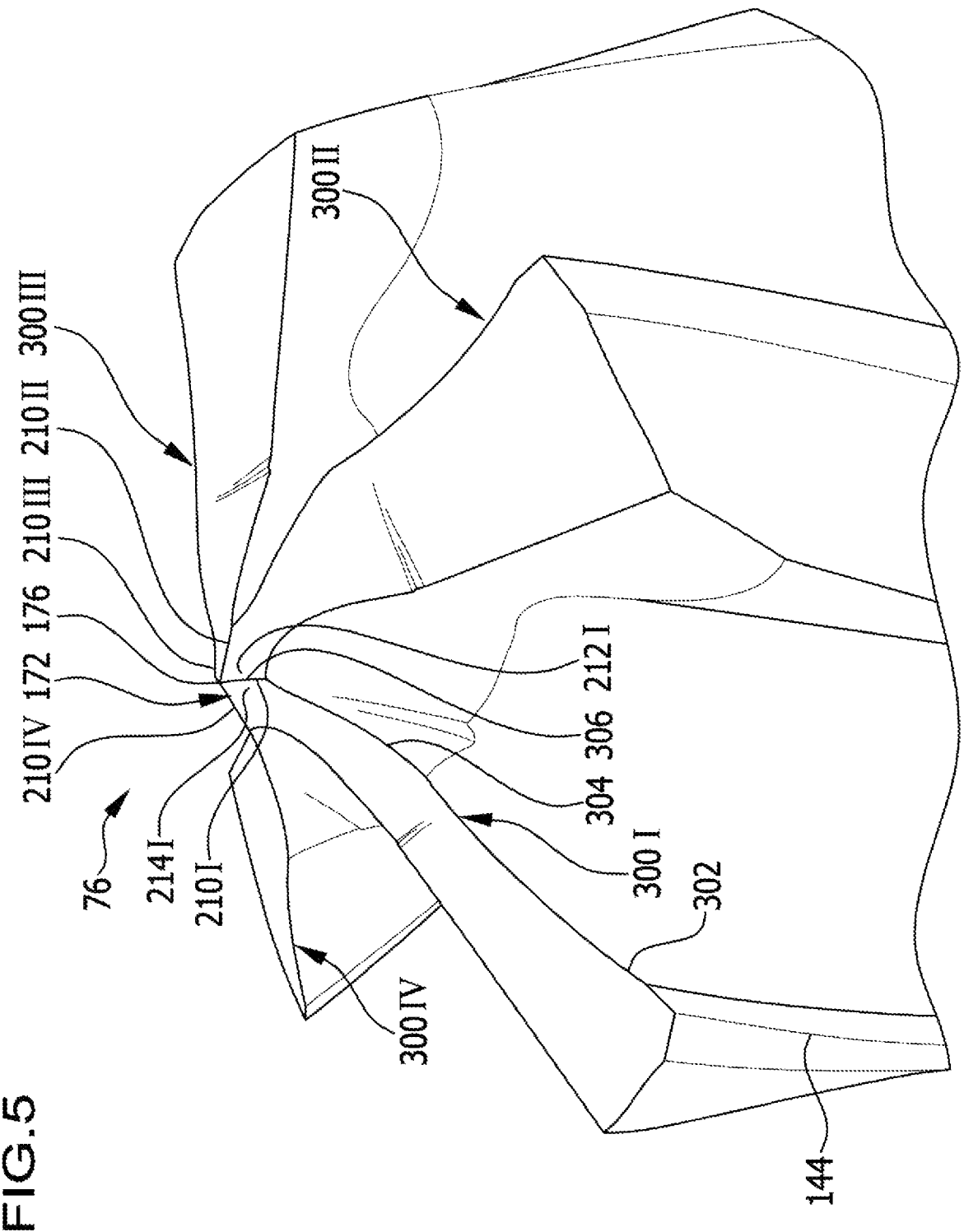
FIG. 5: shows a perspective depiction from a side of the drill tip of the drill in accordance with the first embodiment.
Figure 6:
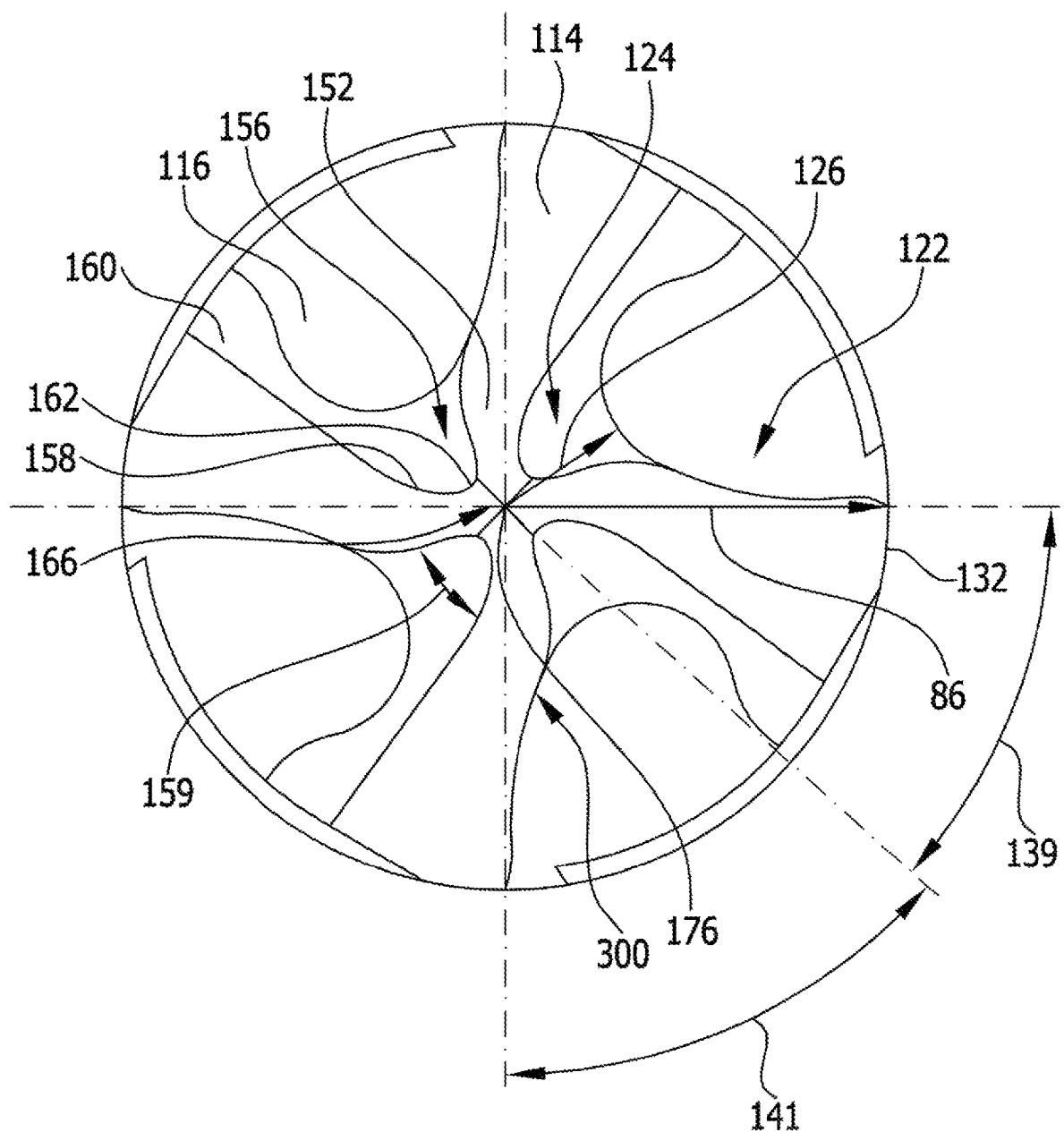
FIG. 6: shows a plan view of the drill tip of the drill of the first embodiment.
Figure 7:
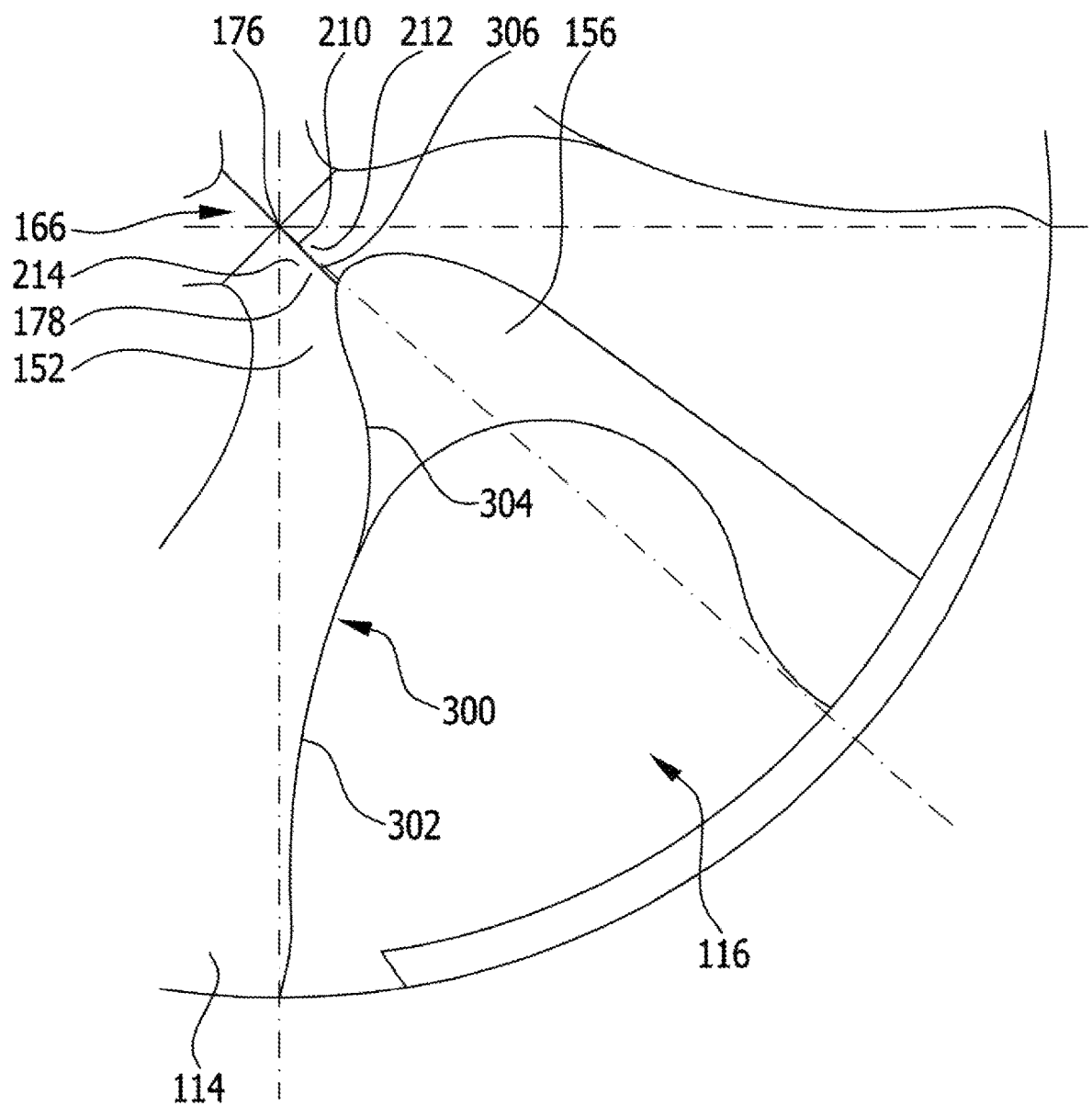
FIG. 7: shows a sectionally enlarged depiction of the depiction in accordance with FIG. 6.
Figure 8:
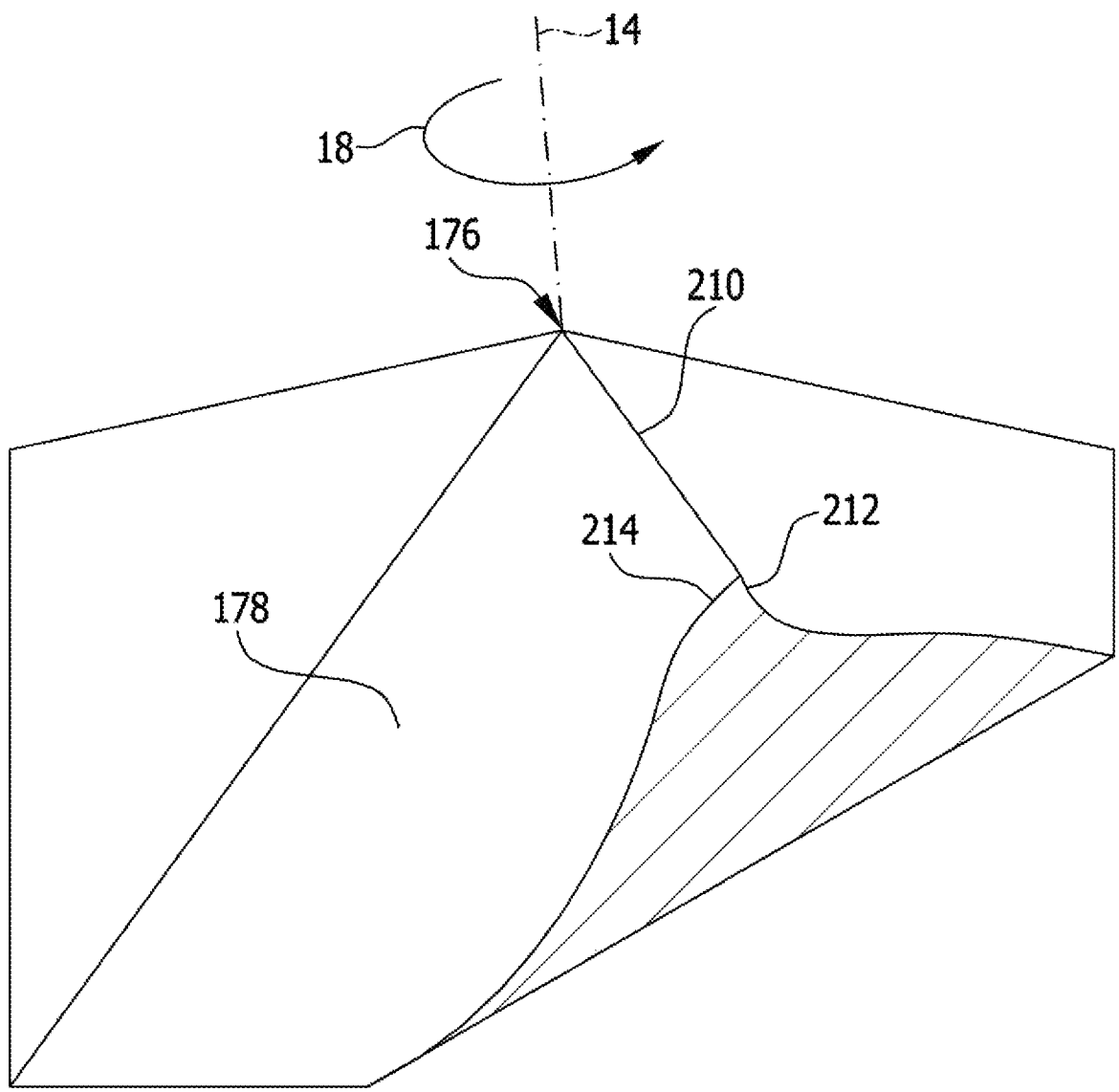
FIG. 8: shows a perspective depiction of a front tip with central cutting edge portions of the drill of the first embodiment, wherein the front tip is cut along a cut face extending substantially perpendicularly to a central cutting edge portion.

In this embodiment, four core wall parts 152I, 152II, 152III, and 152IV are provided in the tip end region 74. The core wall parts 152 extend in the core region 122 (FIGS. 3 and 4).

In particular, each core wall part 152 forms a, preferably continuous, extension of a respective wall part 114 into the core region 122.

In particular, the core wall parts 152 are formed out of the core part 112.

The core wall parts 152 end on the face side 72 and form respective core wall end faces 154. The core wall end faces 54 extend with increasing radial inward extent, in particular rising in the direction of the advance direction.

The core part 112 comprises in the tip end region 75 four core recesses 156I, 156II, 156III, 156IV. The core recesses 156 extend in the axial direction, in particular not into the drilling main portion 78.

A respective core wall part 152 extends between two respective core recesses 156 that are adjacent in the circumferential direction around the drill axis 14. The core wall part 152 extends substantially in the direction radial to the drill axis 14 and delimits, in relation to its radial extent, on each side a respective core recess 156 with a respective core wall side 158.

The core wall part 152I is thus, for example, arranged between the core recesses 156IV and 156I in relation to the circumferential direction around the drill axis 14. Between the two core recesses 156IV and 156I, the core wall part 152I extends, in particular, commencing from the wall part 114I radially inwardly into the core region 122 and, for one, partially delimits with its sides, in relation to this radial extent, the core recess 156IV and the core recess 156I.

The core recesses 156 are open toward the face side, i.e. in the direction of the advance direction 16, and are delimited in the circumferential direction around the drill axis 14 by a respective core wall part 152.

In the direction radial to the drill axis 14, the core recesses 156 merge into a corresponding spiral-shaped recess 116. For example, the core recess 156I merges in the radial direction outwardly into the spiral-shaped recess 116I.

In particular, the respective core wall sides 158 transition into a corresponding wall side 118, namely in particular into a point thinning face 160 thereof, which extends between the wall end face 54 and a wall face of the wall side 118 that delimits the spiral-shaped recess 116 and extends corresponding thereto.

The core recesses 156 each extend in the radial direction, in particular commencing from the respective spiral-shaped recess 116, up to a respective core recess end region 162 into the core part 112.

In particular, the core recesses 156 taper with increasing radial inward extent commencing from the respective spiral-shaped recess 116. The two core wall sides 158 delimiting the corresponding core recess 156 thereby extend with increasing radial inward extent towards one another and meet in the core recess end region 162.

In particular, the two core wall sides 158 extend toward one another substantially at an opening angle 159. For example, the opening angle 159 is at least approximately 35°.

In particular, the core recesses 156 and the spiral-shaped recesses 116 form respective point thinnings for the drill tip 76 in the tip end region 74, for example by means of the point thinning face 160.

The core part 112 comprises a central portion 162, which extends in a central region 166.

The central region 166 extends centrally in the core region 122 with respect to the radial direction to the drill axis 14.

In particular, the central region 166 is a radially innermost region of the core region 122.

In particular, the central region 166 extends in the core region 122 coaxially thereto and to the drill axis 14.

The central portion 162 is the innermost, radially to the drill axis 14, portion of the core part 112.

The drill axis 14 extends through the central portion 162 and said central portion 162 extends substantially coaxially to the drill axis 14.

The central portion 162 is, in particular, of solid configuration in the tip end region 74, i.e. for example free of recesses.

The central portion 162 extends axially up to the face side 72 and there forms a frontal front portion 172. In relation to the advance direction 16, the central portion 162 thus forms the frontmost portion of the drill 10 and, in particular, the drill tip 76.

In particular, the central portion 162 in the front portion 172 is configured as a front tip 176.

A front end of the front portion 172 in relation to the advance direction 16, in particular the front tip 176, is formed by front faces 178 of the central portion 162.

In particular, the front tip 176 is of substantially pyramidal configuration, wherein the front faces 178 substantially form the outer surfaces of the pyramidal front tip 176. It is particularly favorable if the front faces thereby have millings as described in the following.

The front faces 178 preferably extend sharply toward one another to the drill axis 14.

In particular, provision is made for the front faces 178 to transition, in particular continuously transition, with their radial extent at a radially outer rim of the central region 166 into a respective core wall end face 154. For example, the front face 178II transitions into the core wall end face 154II.

In this embodiment, the drill 10 comprises four central cutting edge portions 210I, 210II, 210III, 210IV (FIGS. 5-10).

The central cutting edge portions 210 extend in the central region 166, in particular up to the front tip 176.

In particular, the central cutting edge portions 210 extend outwardly substantially commencing from the drill axis 14 at least approximately in the radial direction, for example up to the rim of the central region 166.

In particular, central cutting edge portions 210 do not extend beyond the central region 166.

In particular, the central cutting edge portions 210 extend at least approximately at the same angle to respectively adjacent central cutting edge portions 210 toward the drill axis 14.

Figure 9:
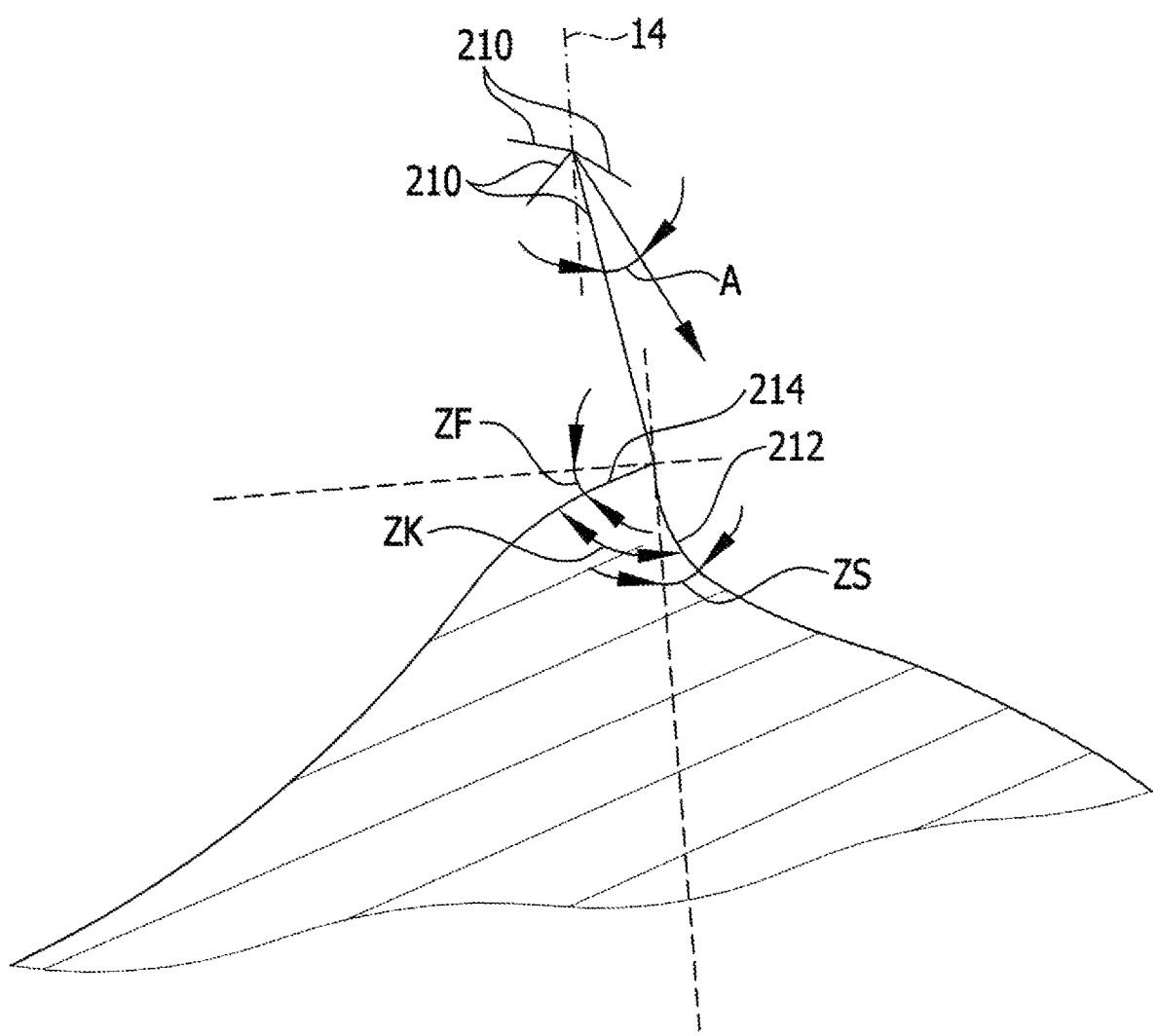

In particular, the central cutting edge portions 210 extend radially inwardly toward the drill axis 14 and extend along this radial extent obliquely to the radial direction of the drill axis 14, wherein the course of the central cutting edge portions 210 encloses an angle of inclination A with the radial direction (FIG. 9).

The central cutting edge portions 210 are each formed by a central rake face 212 and a central flank 214. The central rake face 212 and the central flank 212 meet one another at the central cutting edge portion 210 at a central wedge angle ZK.

The central rake face 212 is thereby arranged before the central flank 212 in relation to a rotation of the drill 10 about the drill axis 14 in the direction of rotation 18.

The central wedge angle ZK and the meeting of the central rake face 212 and the central flank 214 is thereby configured in such a way that the respective central cutting edge portion 210 is configured to cut.

The central flank 214 extends at a central clearance angle ZF toward the central cutting edge portion 210, wherein the central clearance angle ZF is measured between the course of the central flank 214 and a geometric reference face extending perpendicularly to the drill axis 14 (FIG. 9). In particular, the central clearance angle ZF is between 1° and 20°.

The central rake face 212 extends at a central rake angle ZS toward the central cutting edge portion 210, wherein the central rake angle ZS is measured between the course of the central rake face 212 and a geometric reference face. The geometric radial reference face extends commencing from the drill axis 14 in the radial direction thereof, so that the radial reference face is spanned by the axial direction to the drill axis 14 and a radial direction and contains the drill axis 14.

In particular, the central rake angle ZS is between −5° and 25°. Negative values of the central rake angle hereby correspond to a relief-ground central cutting edge portion 210, such that an undercut emerges in the region of the central rake face 212.

In particular, provision is thus made, when the central cutting edge portion 210 is undercut, for a central rake angle with an absolute value between 0° and 5° to be provided or a non-undercut central cutting edge portion 210 to be provided, the central rake angle ZS then having, for example, an absolute value between 0° and 20°.

The central rake faces 212 and the central flanks 214 are, in particular, formed, in particular milled, by the front faces 178 of the central portion 162.

Figure 10:
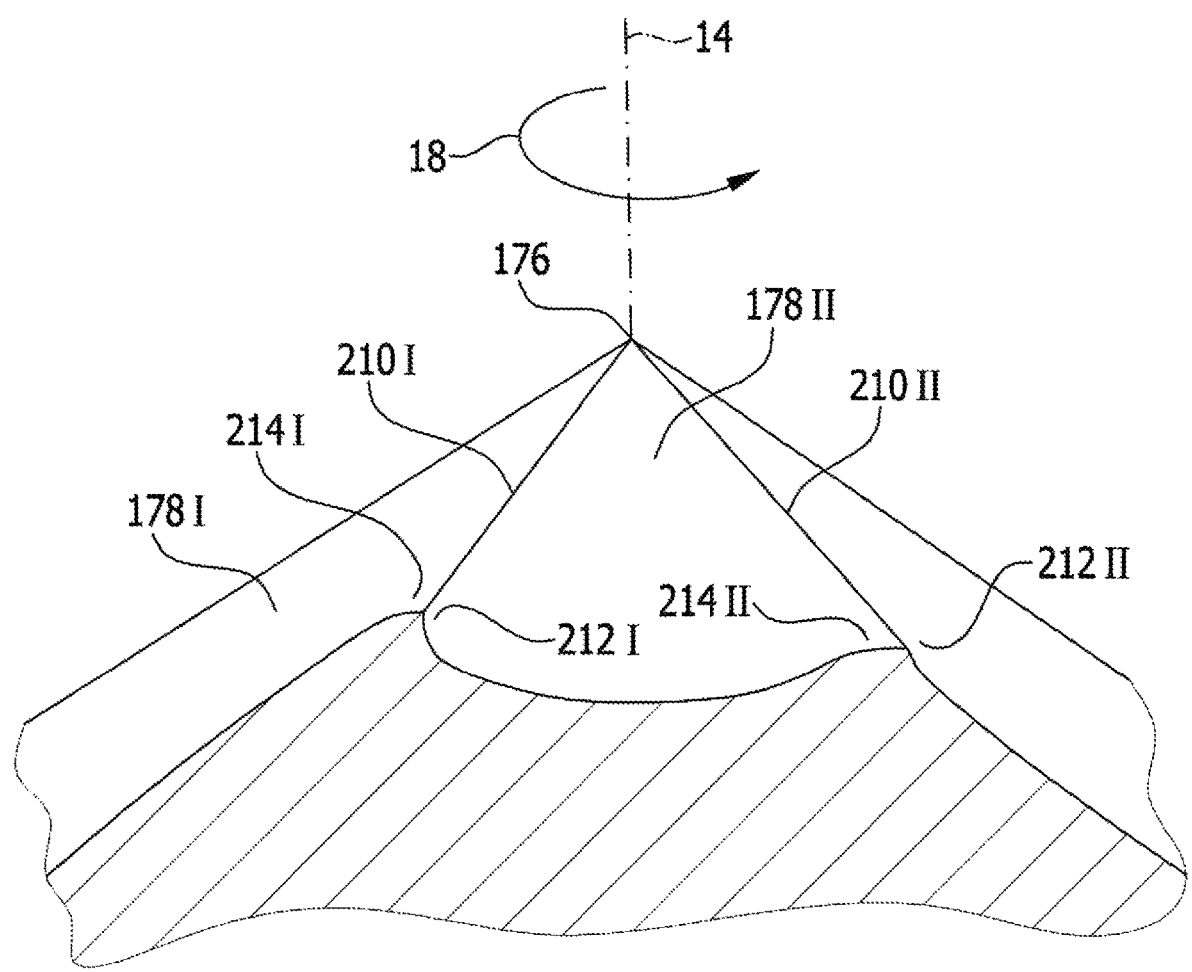
FIG. 10: shows a depiction similar to FIG. 8, wherein the cut extends through two central cutting edge portions.
Figure 11:
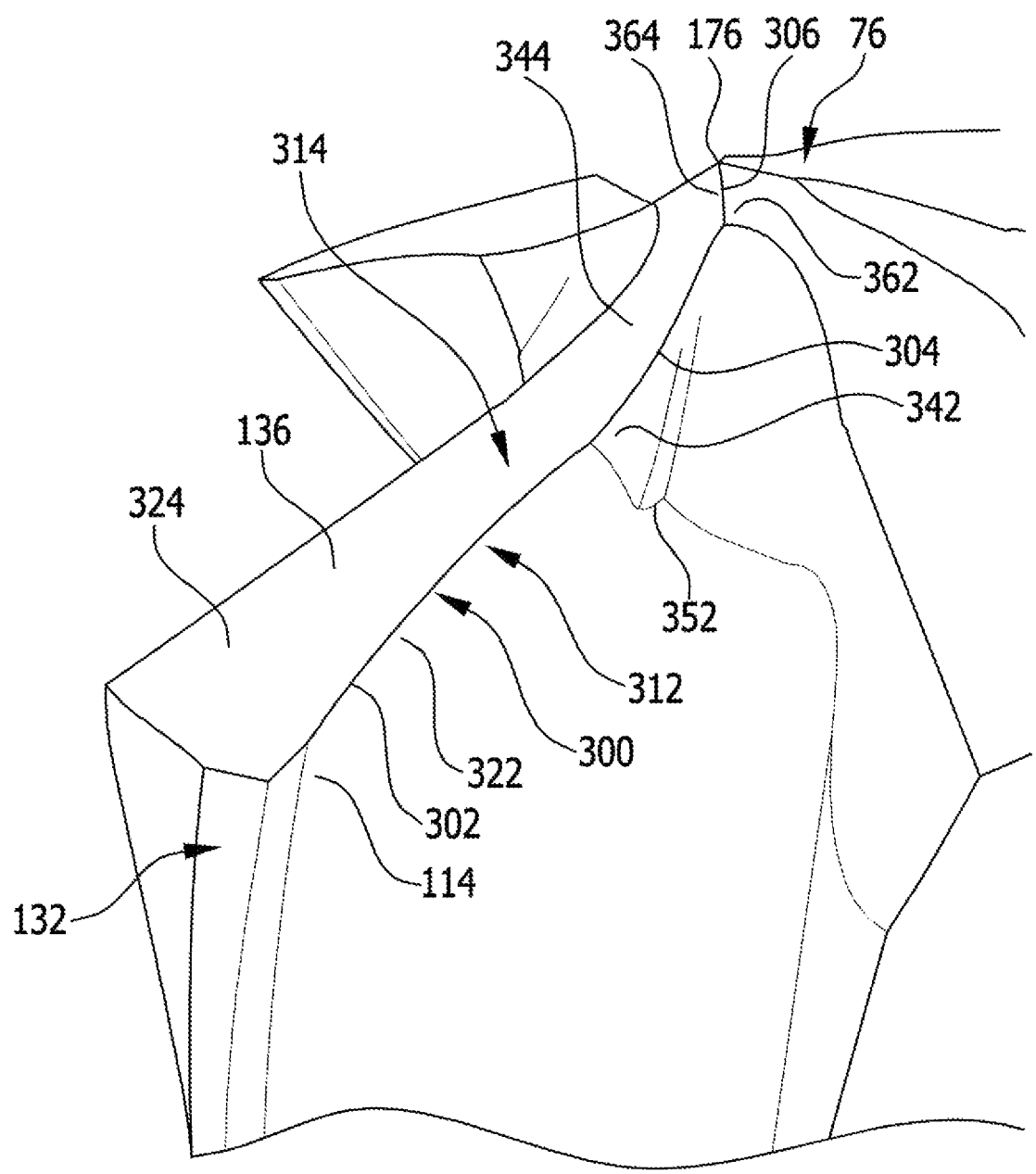
FIG. 11: shows a perspective depiction of the drill from the first embodiment, the depiction being enlarged in the region of a main cutting edge.

A respective front face 178 thereby extends between two respective central cutting edge portions 210 and forms the central rake face 212 on the one side for the one central cutting edge portion 210 and forms the central flank 214 on the other side for the other central cutting edge portion 210. Thus, for example, the front face 178II, which extends between the central cutting edge portions 210I and 210II and, in particular, transitions into the core wall end face 154II, forms on the side of the central cutting edge portion 210I the central rake face 212I thereof and on the side of the central cutting edge portion 210II forms the central flank 214II thereof (FIG. 10).

The front faces 178 are of thus slightly curved configuration in order to thus approach the respective central cutting edge portion 210 on the corresponding sides at the corresponding central clearance angle or central rake angle.

In this embodiment, the drill 10 comprises four main cutting edges 300I, 300II, 300III, 300IV on the drill tip 76 (FIGS. 5-11).

The main cutting edges 300 extend, in particular exclusively, on the face side 72 of the drill 10.

In particular, the main cutting edges 300 comprise individual portions, and in this embodiment, the main cutting edges 300 each comprise a main cutting edge outer portion 302, a main cutting edge core portion 304, and a main cutting edge central portion 306.

The main cutting edges 300 are each formed by a meeting of a rake face 312 and a flank 314. In particular, the rake faces 312 and the flanks 314 each have individual partial faces, which are described in the following in more detail.

The rake face 312 and the flank 314 of a respective main cutting edge 300 meet at a wedge angle K at the main cutting edge 300 and thus form the cutting edge of the main cutting edge 300.

In particular, provision is made for the wedge angle K to vary along the extent of the main cutting edge 300.

The rake face 312 thereby extends at a rake angle S toward the main cutting edge 300. The rake angle S is measured between the course of the rake face 312 and a corresponding geometric radial reference plane, which extends in parallel to the drill axis 14, in particular comprises the drill axis 14. For example, the rake angle S is in a range between −5° and 20°, wherein negative angles of the rake angle S correspond to a relief-ground main cutting edge 300.

In particular, provision is made for the rake angle S to vary along the extent of the main cutting edge 300.

The flank 314 extends at an clearance angle F toward the main cutting edge 300. The clearance angle F is measured between the course of the flank 314 in a corresponding geometric reference plane, which extends perpendicularly to the drill axis 14. For example, the clearance angle F is in the range between 1° and 20°. In particular, provision is made for the clearance angle F to vary along the extent of the main cutting edge 300.

The wedge angle K, the rake angle S, and the clearance angle F are generally defined angles in drilling cutting edges and are not depicted in the drawing.

The main cutting edge outer portion 302 extends through the outer region 124, namely preferably completely therethrough.

The main cutting edge outer portion 302 extends along a correspond wall part 114. For example, the main cutting edge outer portion 302I of the main cutting edge 300I extends along the wall part 114I.

The main cutting edge outer portion 302 thereby extends along an edge of the wall part 114, which is formed by the wall end face 136 and the wall side 118, in particular the surface thereof. The wall side 118 of the wall part 114, which also forms the main cutting edge outer portion 302, is that wall side 118 of the wall part 114 which is arranged at the front of the wall part 114 in relation to the direction of rotation 18.

In particular, the main cutting edge outer portion 302 extends from the outer side 132 of the wall part 114 radially inwardly through the outer region 124.

The surface of the wall side 118 forms an outer rake face 322 as a partial face of the rake face 312 for the main cutting edge outer portion 302.

The wall end face 136 forms an outer flank 324 as a partial face of the flank 314 for the main cutting edge outer portion 302.

Provision is preferably made for the main cutting edge outer portion 302 to be relief-ground, i.e. the rake angle S in the region of the main cutting edge outer portion 302 has a negative value.

The main cutting edge core portion 304 extends through the core region 122 and, in particular, extends completely therethrough.

In particular, the main cutting edge core portion 304 adjoins the main cutting edge outer portion 302 and thus the main cutting edge 300 extends continuously from the outer region 124 into the core region 122.

The main cutting edge core portion 304 extends along the extent of a corresponding core wall part 152. For example, the main cutting edge core portion 304I of the main cutting edge 300I extends along the core wall part 152I.

The main cutting edge core portion 304 is formed on an edge of the core wall part 152. The edge is forms by the core wall end face 154 and the surface of the core wall side 158 meeting one another. The core wall side 158 of the core wall part 152, which forms the main cutting edge core portion 304, is thereby that core wall side 158 which is arranged at the front on the core wall part 152 in relation to the direction of rotation 18.

The surface of the core wall side 158 thereby forms a core rake face 342 as a partial face of the rake face 312 for the main cutting edge core portion 304.

The core rake face 342 extends at a core rake angle KS to the main cutting edge core portion 304. In this embodiment, provision is made for the main cutting edge core portion 304 to not be undercut and thus the core rake angle KS has a positive value. In one variant of the embodiment, however, provision is made for the main cutting edge 300 to be undercut in the region of the main cutting edge core portion 304, at least partially, and thus the core rake angle KS has a negative value at least in sections.

When milling the core rake face 342, it may be helpful to mill into an axial base of the corresponding core recess 156, so as to form a pocket 352 there. The core recess 156 thus has in the pocket 352 an axial incision, on the one side of which the core rake face 342 extends. On the other side of the pocket 352, the surface thereof slightly rises in axial direction and then transitions into the core wall side 158, which otherwise extends smoothly.

By milling the pocket 352, it can be achieved that the main cutting edge 300 extends continuously without a kink at the transition between the wall part 114 and the core wall part 152.

The main cutting edge core portion 304 extends, in particular, radially inwardly in the core region 122 and up to the central region 166 and there preferably transitions into the main cutting edge central portion 306.

The main cutting edge central portion 306 extends in the central region 166. In particular, the main cutting edge central portion 306 extends radially through the central region 166 up to the front tip 176 and thus substantially up to the drill axis 14.

Partial regions of the front faces 178 thereby form for the respective main cutting edge central portions 306 a respective main cutting edge central rake face 362 as a partial face of the rake face 312 for the main cutting edge 300 in the central region 166.

In addition, partial regions of the front faces 178 form for the respective main cutting edge central portions 306 a respective main cutting edge central flank 364 as a partial face of the flank 314 for the main cutting edge 300 in the central region 166.

The respective main cutting edge central rake face 362 thereby extends at a central rake angle ZS to the main cutting edge central portion 306.

The main cutting edge central flank 364 extends at a central clearance angle ZF to the main cutting edge central portion 306.

In this embodiment, the main cutting edge central portions 306 are formed by the central cutting edge portions 210. For example, the central cutting edge portion 210I corresponds to the main cutting edge central portion 306I.

The main cutting edge central rake face 362 of the main cutting edge central portion 306 thereby corresponds to the central rake face 212 of the central cutting edge portion 210 and the main cutting edge central flank 364 of the main cutting edge central portion 306 corresponds to the central flank 214 of the central cutting edge portion 210. The respective central rake angle and central clearance angle also correspond to one another.

To avoid repetition, regarding the description of the main cutting edge central portions 306, reference is correspondingly made to the statements made in the context of the central cutting edge portions 210 in their entirety.

Figure 12:
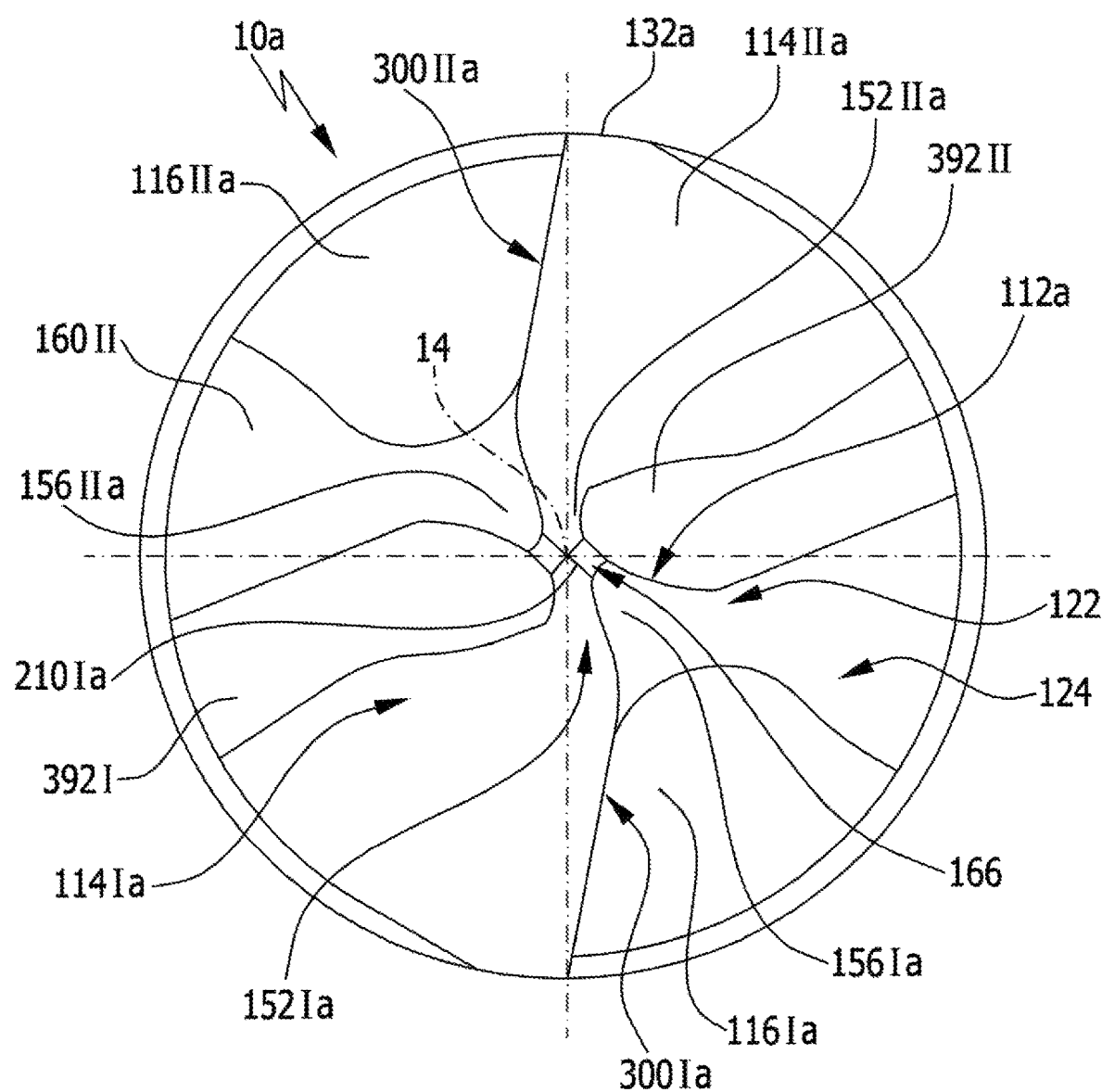
FIG. 12: shows a plan view similar to FIG. 6 of a drill tip of a drill with two main cutting edges and four central cutting edge portions in accordance with a second embodiment.
Figure 13:
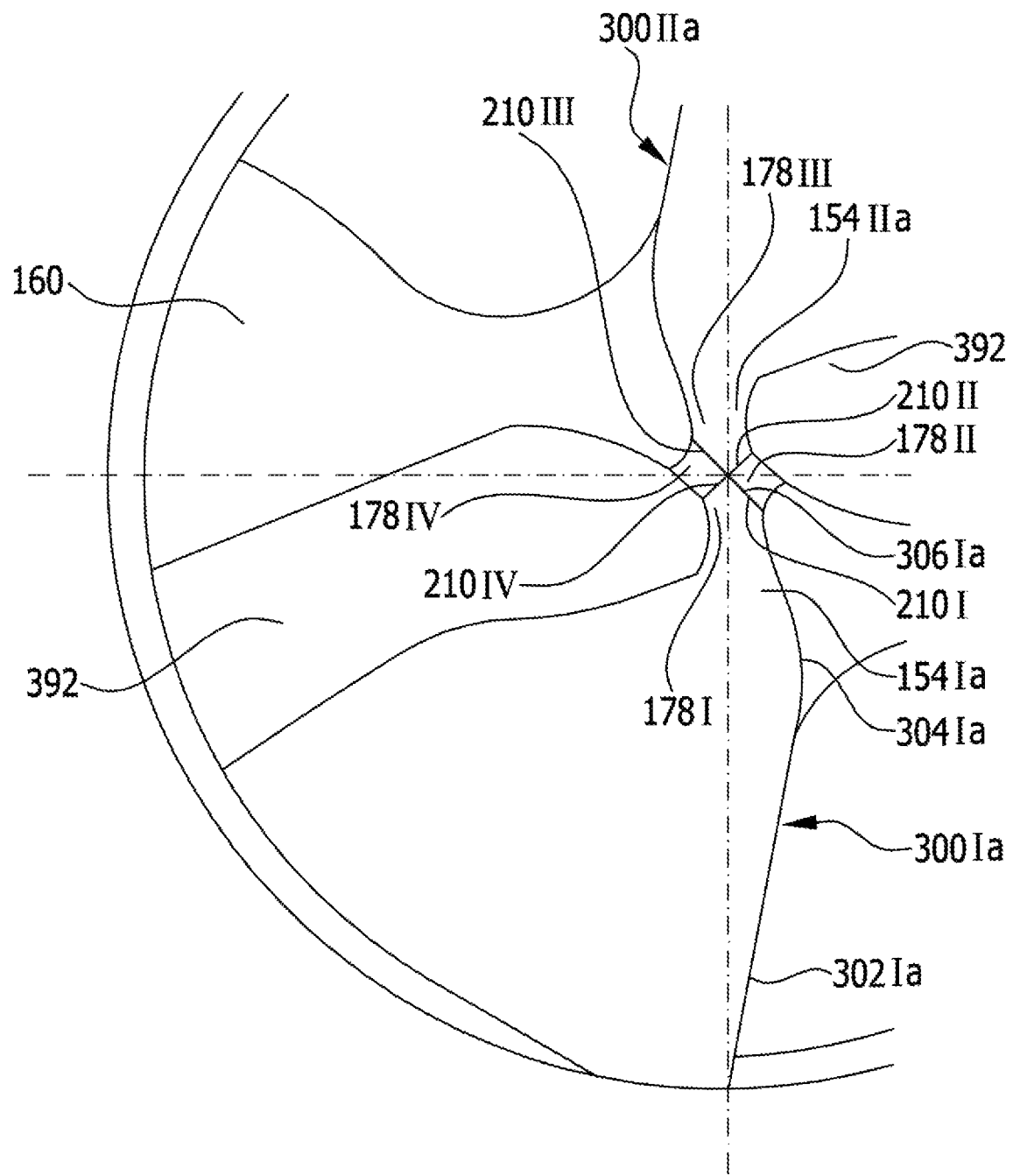
FIG. 13: shows a sectionally enlarged depiction of FIG. 12.
Figure 14:
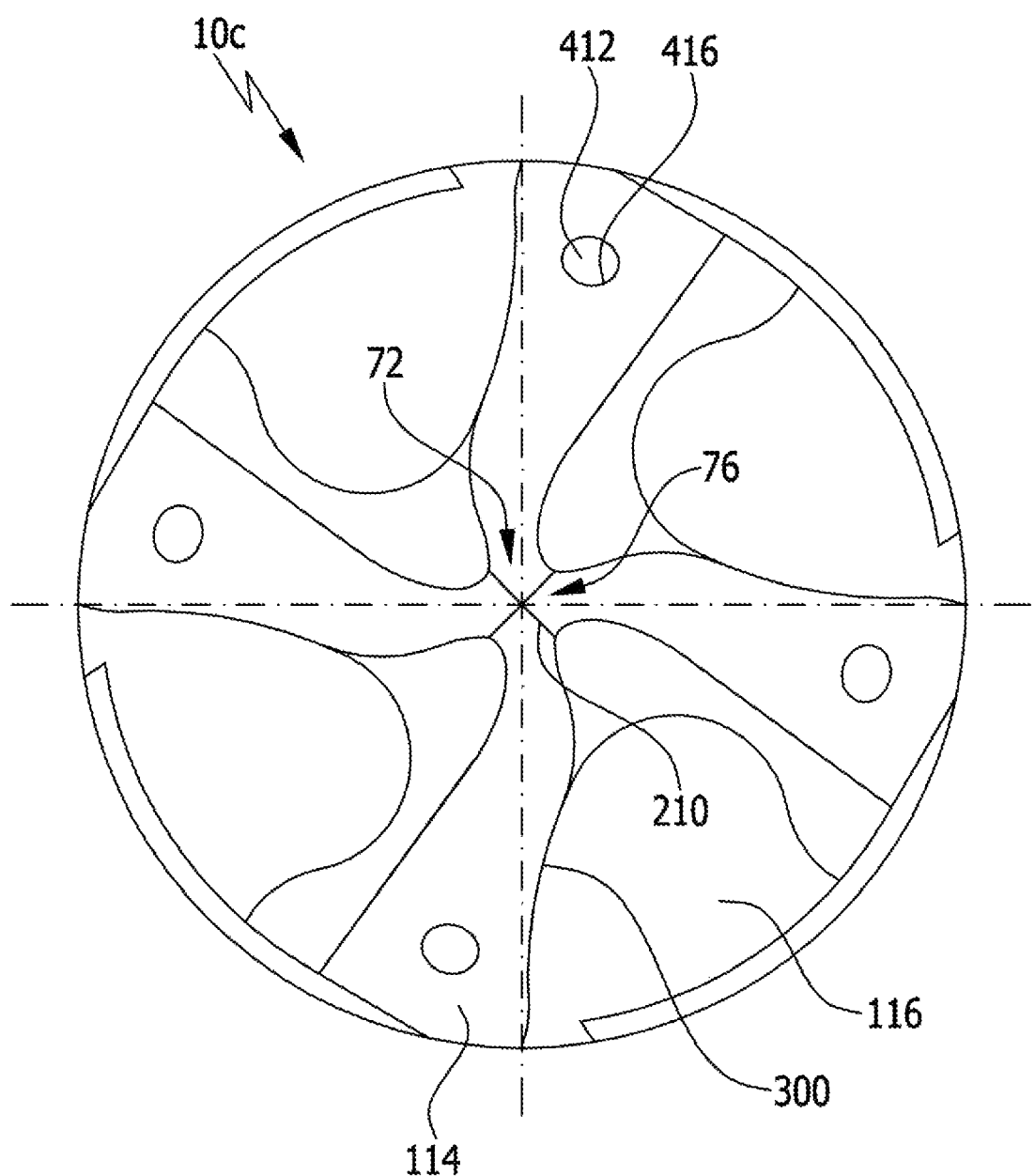
FIG. 14: shows a plan view similar to FIG. 6 of a drill tip of a drill with cooling channels in the wall parts in accordance with a third embodiment.
Figure 15:
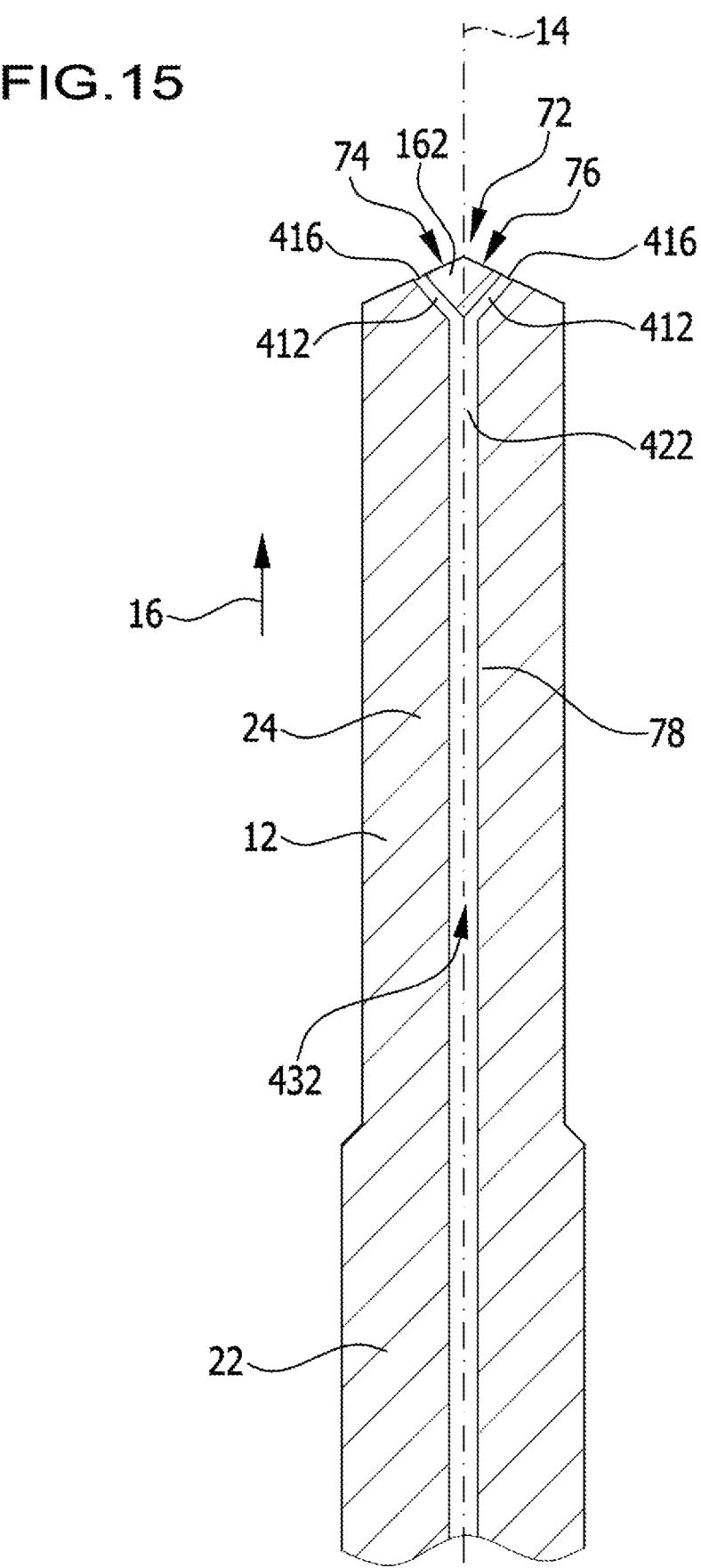
FIG. 15: shows a cut extending axially to the drill axis through a variant of the drill in accordance with the third embodiment.
Figure 16:
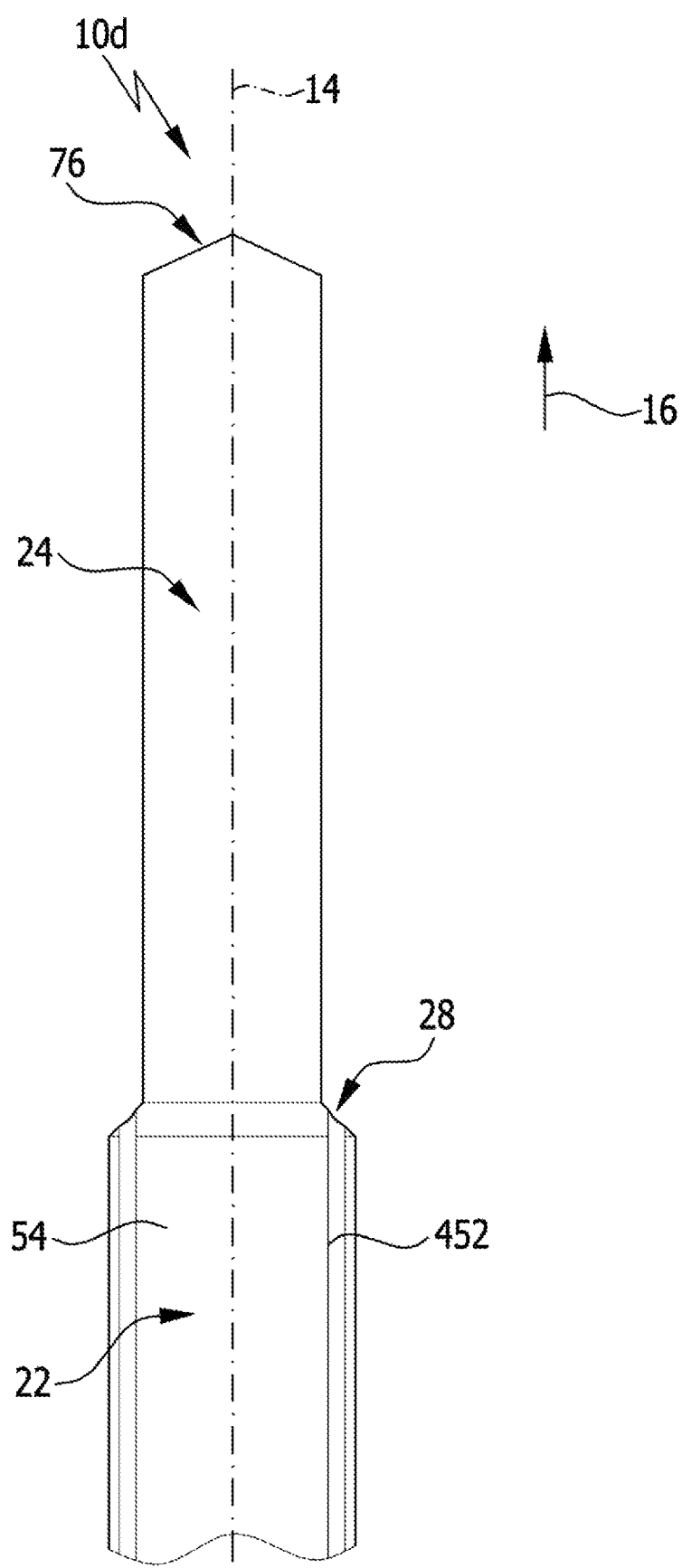
FIG. 16: shows a schematic side view of a drill with grooves in a fastening portion of same in accordance with a fourth embodiment.
Figure 17:
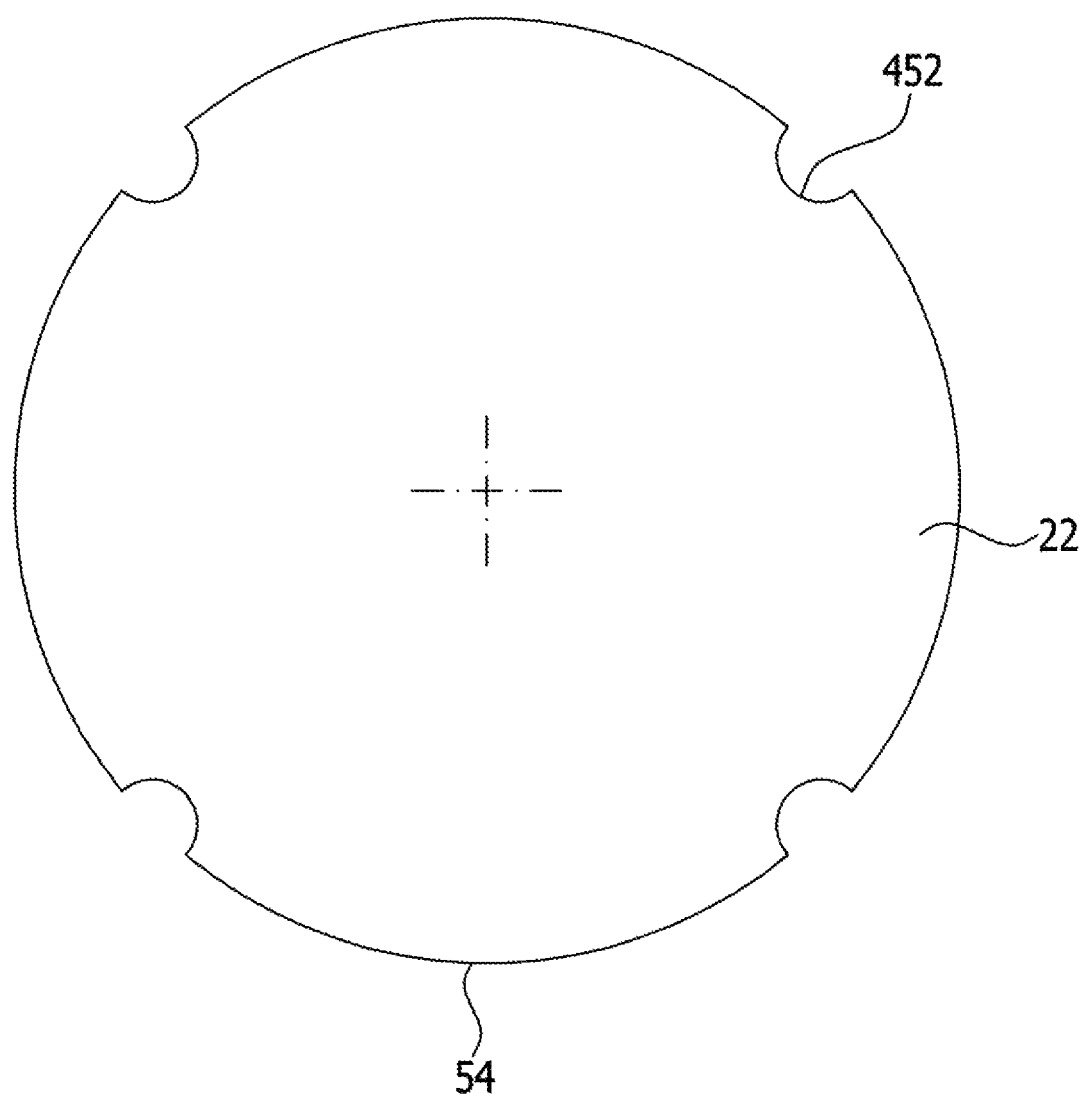
FIG. 17: shows a schematic cross section extending perpendicularly to the drill axis through the fastening portion of the drill of the fourth embodiment.

In a second embodiment of a drill 10a, depicted for example in FIGS. 12 and 13, those elements and features which fulfill the at least basically same function and/or are of substantially identical configuration as corresponding elements and features in the first embodiment are denoted with the same reference numeral and, regarding the description of same, reference is made to the statements made in the context of the first embodiment in their entirety. Wherever alternative embodiments of elements of features with at least basically the same function and/or that are of substantially identical configuration are described, a letter "a" designating the alternative embodiment is added to the same reference numeral and insofar as those elements and features are not described in more detail in the following, reference shall be made regarding the description of same to the statements made in the context of the first embodiment.

Unlike the first embodiment, the drill 10a of the second embodiment comprises two main cutting edges 300Ia and 300IIa.

Correspondingly, the drill 10a comprises two wall parts 114Ia and 114IIa and two spiral-shaped recesses 116Ia and 116IIa, which form corresponding flutes.

The wall parts 114a are correspondingly configured thicker in the circumferential direction around the drill axis 14 than the wall parts 114 of the first embodiment.

The spiral-shaped recesses 116a are also correspondingly configured wider in the circumferential direction around the drill axis 14 than the spiral-shaped recesses 116 of the first embodiment.

The spiral-shaped recesses 116a and the wall parts 114a also extend spirally in an outer region 124 around a core part 112a, which is arranged in a core region 122.

However, the drill 10a correspondingly comprises only two core recesses 156Ia and 156IIa, which are arranged between two core wall parts 152Ia and 152IIa and are delimited thereby.

The respective core recesses 156a opening radially outwardly correspondingly to the corresponding spiral-shaped recesses 116a.

The core wall parts 152a transition with their radial extent outwardly into the wall parts 114a.

In addition, the drill 10a comprises a central portion 162a in a central region 166.

As in the first embodiment, the drill 10a comprises four central cutting edge portions 210I, 210II, 210III, 210IV, and, in particular, a front tip 156 in the front portion 172 of the central portion 162a.

Extending accordingly between the central cutting edge portions 210 are four front faces 178I, 178II, 178III, 178IV, which, correspondingly to the first embodiment, form central rake faces 212 and central flanks 214 for the central cutting edge portions 210.

Unlike in the first embodiment, only two front faces 178, for example the front faces 178I and 178III, transition, in particular smoothly, into a respective core wall end face 154, for example into the core wall end face 154I and 154III, respectively. The two other front faces 178, for example the front faces 178II and 178IV, adjoin a respective point-thinning face 160 and, in particular, an intermediate face 392, wherein, in particular, an edge is provided on the boundary thereof.

The intermediate face 392 extends from the transition from the central region 166 into the core region 122 radially outwardly to the outer region 124, in particular therethrough, up to the outer side 132 and between the respective core wall end face 154 and wall end face 136 on the one hand and the point-thinning face 160 on the other hand.

In one variant, two respective front faces 178 transition into a respective core wall end face 154. For example, the front faces 178I and 178IV transition into the core wall end face 154Ia.

In particular, the two main cutting edges 300a also comprise different portions, in particular a main cutting edge outer portion 302a, a main cutting edge core portion 304a, and a main cutting edge central portion 306a.

In particular, the two main cutting edge central portions 306Ia and 306IIa are thereby each formed by a central cutting edge portion 210. In this embodiment, the main cutting edge central portion 306I is formed by the central cutting edge portion 210I and the main cutting edge central portion 306IIa is formed by the central cutting edge portion 210III.

The two other central cutting edge portions 210II and 210IV, however, do not form a main cutting edge central portion 306.

The two central cutting edge portions 210 forming a main cutting edge central portion 306, i.e. for example the central cutting edge portions 210I and 210III, are thereby each arranged between the two central cutting edge portions 210 that do not form a main cutting edge central portion 306, i.e. for example the central cutting edge portion 210II and 210IV.

Thus in each case a central cutting edge portion 210 forming a main cutting edge central portion 306 and a central cutting edge portion 210 that does not form a main cutting edge central portion 306 are arranged alternatingly one behind the other in the circumferential direction around the drill axis 14.

In particular, this drill 10a with two main cutting edges 300a is configured substantially rotationally symmetrically with respect to rotations of 180° around the drill axis 14, wherein the configuration in the central region 166 with the four central cutting edge portions 210 is also configured rotationally symmetrically with respect to rotations 90° around the drill axis 14.

In particular, the central portion 162 with the front tip 176 in the second embodiment is configured substantially rotationally symmetrically with respect to rotations of 90° around the drill axis 14.

In all other respects, all further features and elements are at least basically the same as in the first embodiment, such that reference is made to the statements made in the context of this embodiment in their entirety.

In a third and fourth embodiment and their variants, which are depicted for example in FIGS. 14 to 17, those elements and features which fulfill at least basically the same functions or are of at least substantially identical configuration as in the first or second embodiment are denoted with the same reference numeral as in the aforementioned embodiments and, regarding the description of same, reference is made to the above statements made in the context of these embodiments in their entirety. In alternative embodiments, a letter denoting the embodiment is added to the same reference numeral.

In a drill 10*c* of the third embodiment, channels 412 are provided in the wall parts 114*c*.

In particular, a channel 412 is provided in each of the wall parts 114*c*.

In variants of the embodiment, a channel 412 is provided in only some of the wall parts 114*c*.

For example, channels 412 are arranged in two of four wall parts 114*c*, wherein, in particular, in each case a wall part 114*c* with a channel 412 and a wall part 114*c* without a channel 412 are arranged alternatingly one behind the other in relation to the circumferential direction around the drill axis 14.

Although the drill 10*c* is depicted in the graphic representation having four wall parts 114*c* and four main cutting edges 300, the description for drills with a different number of wall parts and main cutting edges, for example with three wall parts 114*c* and three main cutting edges 300 or with two wall parts 114*c* and two main cutting edges 300 applies correspondingly.

On the face side 72, the wall part 114*c* comprises, in particular on the wall end face 136, an opening 416 of the channel 412.

Commencing from the opening 416, the channel 412 runs through the wall part 114*c* at least in a front region in relation to the advance direction 16.

For example, the channel 412 extends radially inwardly in the direction to the drill axis 14 and there opens with the further channels 412 into a central channel 422.

The central channel 422 extends axially through the drilling portion 24*c*, in particular up to the fastening portion 22.

In particular, the central channel 422 extends only in the drilling main portion 78*c*, such that the central portion 162*c* in the tip end region 74 is also of solid configuration in the radially inward region around the drill axis 14

In particular, the drilling main portion 78*c* is of solid configuration except for the central channel 422 and, in particular, the spiral-shaped recesses 116 extend only in the outer region 124.

The central channel 422 extends further through the base body 12*c* up to a further opening, which is not depicted in the drawing.

In one variant of the embodiment, the channel 412 as well as the wall part 114*c* extend spirally following the spiral-shaped extent of said wall part 114*c*. Thus in this variant, the channel 412 runs through the wall part 114*c* along the spiral-shaped extent thereof. For example, in this variant, the channels 412 connect in the fastening portion 22 or in the transition region between the fastening portion 22 and the drilling portion 24*c* into a central channel 422.

The channels 412 and in particular also the central channel 422 are, in particular, part of a cooling device 432 for the drill 10*c*.

For example, a cooling and/or lubricating liquid can be introduced via the opening, which is not depicted in the drawing, into the central channel 422 and via the central channel 422 into the channel 412 or, in variants, directly into the channel 412. The cooling and/or lubricating liquid exits the opening 416 on the face side 72 and cools the drill 10*c* and the workpiece to be drilled.

In a fourth embodiment of a drill 10*d*, grooves 452 are provided on the outer side 54*d* of the fastening portion 22*d*.

In particular, the grooves 452 extend in the direction axial to the drill axis 14 along the outer side 54*d* of the fastening portion 22*d*.

In particular, the grooves 452 extend up to a front end of the fastening portion 22*d* in relation to the advance direction 16, for example into the transition region 28.

In particular, the grooves 452 extend in the axial direction toward the drilling portion 24.

In this embodiment, the grooves 452 are provided as part of a cooling device 432.

A cooling and/or lubricating liquid can be guided through the grooves 452 and be brought to the location to be drilled on the workpiece to be drilled.

In all other respects, the remaining features and elements in the third and fourth embodiments are at least substantially identical to those in the first and/or second embodiments, such that, with regarding the description of same, reference is made to the above statements made in the context of these embodiments in their entirety.

What is claimed is:

1. Drill, comprising:
    a base body extending substantially longitudinally in a direction axial to a drill axis, said base body comprising
        a drilling portion,
        a radially inward core region in relation to the drill axis and a radially outer region provided in the base body in the drilling portion,
        the drilling portion comprising a core part in the core region and a plurality of spiral-shaped recesses in the outer region,
        a plurality of wall parts, each one of the plurality of wall parts arranged between two respective spiral-shaped recesses, each of the plurality of wall parts extending spirally along an axial extent of the core part, and
    at least four main cutting edges, each of which extend, at least in sections, along a radial extent of a respective wall part of the plurality of wall parts, and extend radially inward, in relation to the drill axis, up to a front tip point at the drill axis.

2. Drill in accordance with claim 1, wherein the at least four main cutting edges comprise exactly four main cutting edges.

3. Drill in accordance with claim 1, wherein the drill, in relation to a location and/or a configuration of the at least four main cutting edges, is of rotationally symmetrical configuration with respect to a rotation of 360°/N about the drill axis, N being the number of main cutting edges.

4. Drill in accordance with claim 1, wherein at least one of the at least four main cutting edges comprises a main cutting edge outer portion extending in the outer region, wherein at least one main cutting edge outer portion extends in a direction radial to the drill axis completely through the outer region.

5. Drill in accordance with claim 1, wherein at least one of the at least four main cutting edges comprises a main cutting edge core portion, which extends in the core region.

6. Drill in accordance with claim 5, wherein at least one main cutting edge core portion extends along a core wall part.

7. Drill in accordance with claim 5, wherein in at least one of the at least four main cutting edges, the main cutting edge core portion and a main cutting edge outer portion thereof merge into one another.

8. Drill in accordance with claim 5, wherein at least one of the at least four main cutting edges comprises a main cutting edge central portion, which extends in a central region that is central in relation to the drill axis in a radial direction and at least in one of the at least four main cutting edges the main cutting edge central portion thereof merges into the main cutting edge core portion thereof.

9. Drill in accordance with claim 1, wherein at least one main cutting edge core portion extends along a respective core recess of the base body in the core region.

10. Drill in accordance with claim 9, wherein at least one of the core recesses forms a point thinning with one of the spiral-shaped recesses.

11. Drill in accordance with claim 9, wherein each of the core recesses forms a respective point thinning with a respective spiral-shaped recess.

12. Drill in accordance with claim 1, wherein at least one of the wall parts comprises a secondary cutting edge.

13. Drill in accordance with claim 12, wherein the secondary cutting edge extends substantially along a spiral-shaped shape of the wall part on the outer side thereof.

14. Drill in accordance with claim 1, wherein the base body has a radius with respect to the drill axis in the drilling portion and at least 15% and/or at most 45% of the radius of the base body extends through the core region.

15. Drill in accordance with claim 1, wherein the base body has a larger radius in the region of a fastening portion than in the drilling portion.

16. Drill in accordance with claim 1, further comprising a cooling channel or a plurality of cooling channels.

17. Drill in accordance with claim 16, wherein at least one cooling channel extends at least in sections through one of the wall parts.

18. Drill in accordance with claim 16, wherein at least one cooling channel extends at least approximately along an entire spiral-shaped extent of one of the wall parts.

19. Drill in accordance with claim 16, wherein at least one cooling channel extends on an outer side of the fastening portion.

20. Drill, comprising:
a base body extending substantially longitudinally in a direction axial to a drill axis, said base body comprising a drilling portion,
the drilling portion extending in a direction axial to the drill axis up to a face side, the face side being arranged at a front of the drill,
a radially inward core region in relation to the drill axis and a radially outer region provided in the base body in the drilling portion,
the drilling portion comprising a core part in the core region and a plurality of spiral-shaped recesses in the outer region,
a plurality of wall parts, each of the plurality of wall parts arranged between two respective spiral-shaped recesses, each of the plurality of wall parts extending spirally along an axial extent of the core part up to the face side, and
at least four central cutting edge portions, each of the at least four central cutting edge portions extends along the face side radially inwardly, in relation to the drill axis, up to a front tip point at the drill axis, wherein each of the at least four central cutting edge portions is of a cutting configuration.

21. Drill in accordance with claim 20, wherein in at least one of the central cutting edge portions a central flank of the base body extends at a central clearance angle up to the central cutting edge portion, wherein the central clearance angle is measured between the central flank and a geometric reference plane extending perpendicularly to the drill axis, and wherein the central clearance angle is at least 3° and/or at most 25°.

22. Drill in accordance with claim 20, wherein in at least one of the central cutting edge portions a central rake face of the base body extends at a central rake angle up to the central cutting edge portion, wherein the central rake angle is measured between the central rake face and a geometric radial reference face, which extends in parallel to the drill axis, and wherein the central rake angle is at least −5° and/or is at most 20°, wherein negative values of the central rake angle correspond to an undercut of the central cutting edge portion.

23. Drill in accordance with claim 20, wherein at least one central cutting edge portion extends at an angle of inclination to the drill axis, which angle is at least 5° and/or at most 40°, wherein the angle of inclination is measured between a course of the central cutting edge portion and a radial direction of the drill axis.

24. Drill in accordance with claim 20, further comprising at least two main cutting edges, wherein at least one of the at least two main cutting edges comprises a main cutting edge central portion, which extends in a central region that is central in relation to the drill axis in a radial direction.

25. Drill in accordance with claim 24, wherein at least in one of the at least two main cutting edges the main cutting edge central portion thereof merges into a main cutting edge core portion thereof.

26. Drill in accordance with claim 24, wherein at least one of the main cutting edge central portions is formed by one of the central cutting edge portions.

27. Drill in accordance with claim 20, wherein:
the core region has a radius with respect to the drill axis and at least 15% and/or at most 50% of the radius of the core region extends through a central region of the core region; and
the central cutting edge portions are provided in the central region.

28. Drill in accordance with claim 20, further comprising a cooling channel or a plurality of cooling channels.

29. Drill, comprising:
a base body extending substantially longitudinally in a direction axial to a drill axis, said base body comprising a drilling portion,
a radially inward core region in relation to the drill axis and a radially outer region provided in the base body in the drilling portion,
the drilling portion comprising a plurality of spiral-shaped recesses in the outer region,
a plurality of wall parts, each of the plurality of wall parts arranged between two respective spiral-shaped recesses, and
at least four central cutting edge portions, each of the at least four central cutting edge portions extends radially inwardly, in relation to the drill axis, up to a front tip, wherein:
each of the at least four central cutting edge portions is of a cutting configuration;
in at least one of the central cutting edge portions a central rake face of the base body extends at a central rake angle up to the central cutting edge portion and a central flank of the base body extends at a central clearance angle up to the central cutting edge portion;

the central rake angle is measured between the central rake face and a geometric radial reference face, which extends in parallel to the drill axis;

the central rake angle is at least −5° and/or is at most 20°, wherein negative values of the central rake angle correspond to an undercut of the central cutting edge portion; and the central clearance angle is measured between the central flank and a geometric reference plane extending perpendicularly to the drill axis, and wherein the central clearance angle is at least 3° and/or at most 25°.

30. Drill in accordance with claim 29, wherein at least one central cutting edge portion extends at an angle of inclination to the drill axis, which angle is at least 5° and/or at most 40°, wherein the angle of inclination is measured between a course of the central cutting edge portion and a radial direction of the drill axis.

31. Drill in accordance with claim 29, further comprising at least two main cutting edges, wherein at least one of the at least two main cutting edges comprises a main cutting edge central portion, which extends in a central region that is central in relation to the drill axis in a radial direction.

32. Drill in accordance with claim 29, further comprising a cooling channel or a plurality of cooling channels.

33. Drill, comprising:
- a base body extending substantially longitudinally in a direction axial to a drill axis, said base body comprising a drilling portion,
- a radially inward core region in relation to the drill axis and a radially outer region provided in the base body in the drilling portion,
- the drilling portion comprising a plurality of spiral-shaped recesses in the outer region,
- a wall part arranged between each two spiral-shaped recesses,
- at least four main cutting edges, which extend radially inward, in relation to the drill axis, up to a front tip point at the drill axis, and
- each of the at least four main cutting edges comprises a curved main cutting edge outer portion extending in the outer region.

* * * * *